US012656844B2

(12) United States Patent
Hiregoudar et al.

(10) Patent No.: US 12,656,844 B2
(45) Date of Patent: Jun. 16, 2026

(54) COLD DATA STORAGE ENERGY CONSUMPTION EVALUATION AND RESPONSE

(71) Applicant: NetApp, Inc., San Jose, CA (US)

(72) Inventors: Abhishek Hiregoudar, Arlington, MA (US); Edward John Barron, II, Pepperell, MA (US); Gregory Eugene Stabler, Durham, NC (US)

(73) Assignee: NETAPP, INC., San Jose, CA (US)

( * ) Notice: Subject to any disclaimer, the term of this patent is extended or adjusted under 35 U.S.C. 154(b) by 0 days.

(21) Appl. No.: 18/496,590

(22) Filed: Oct. 27, 2023

(65) Prior Publication Data

US 2024/0069614 A1 Feb. 29, 2024

Related U.S. Application Data

(63) Continuation-in-part of application No. 18/115,353, filed on Feb. 28, 2023.

(60) Provisional application No. 63/394,830, filed on Aug. 3, 2022.

(51) Int. Cl.
| | |
|---|---|
| *G06F 1/26* | (2006.01) |
| *G06F 1/32* | (2019.01) |
| *G06F 3/06* | (2006.01) |
| *G06F 9/445* | (2018.01) |
| *G06F 9/50* | (2006.01) |
| *G06F 11/30* | (2006.01) |
| *G06F 11/34* | (2006.01) |

(52) U.S. Cl.
CPC .............. *G06F 1/26* (2013.01); *G06F 3/0625* (2013.01); *G06F 1/32* (2013.01); *G06F 3/0653* (2013.01); *G06F 3/067* (2013.01); *G06F 9/44505* (2013.01); *G06F 9/5094* (2013.01); *G06F 11/3062* (2013.01); *G06F 11/3409* (2013.01)

(58) Field of Classification Search
CPC ........ G06F 1/26; G06F 9/5094; G06F 3/0625; G06F 3/067; G06F 3/0653; G06F 11/3062; G06F 11/3409; G06F 1/32; G06F 9/44505
USPC .......................................... 713/100, 300, 320
See application file for complete search history.

(56) References Cited

U.S. PATENT DOCUMENTS

| | | | | |
|---|---|---|---|---|
| 9,454,321 | B1 * | 9/2016 | Smaldone ............... | G06F 3/061 |
| 11,592,989 | B1 * | 2/2023 | Gupta ................... | G06F 3/0664 |
| 12,461,756 | B2 | 11/2025 | Stabler et al. | |

(Continued)

OTHER PUBLICATIONS

Final Office Action mailed on Feb. 25, 2025 for U.S. Appl. No. 18/115,353, filed Feb. 28, 2023, 09 pages.

(Continued)

*Primary Examiner* — Ji H Bae
(74) *Attorney, Agent, or Firm* — JAFFERY WATSON HAMILTON & DESANCTIS LLP

(57) ABSTRACT

Various mechanisms and workflows are described that can utilize power and/or carbon footprint-based metrics to manage storage unit usage and/or configuration, which can provide a more efficient and environmentally friendly computing environment. In some example configurations, storage system management mechanisms collect power consumption for storage units (e.g., individual drives, storage shelfs, nodes, clusters) and can utilize the power consumption information with other storage unit characteristics to generate power and carbon footprint metrics.

20 Claims, 20 Drawing Sheets

(56)        References Cited

U.S. PATENT DOCUMENTS

| | | | |
|---|---|---|---|
| 2014/0215041 A1* | 7/2014 | Mann | G06F 1/3206 |
| | | | 709/223 |
| 2016/0004475 A1* | 1/2016 | Beniyama | G06F 3/0613 |
| | | | 710/74 |
| 2018/0088807 A1* | 3/2018 | Zhao | G06F 3/0644 |
| 2020/0326871 A1* | 10/2020 | Wu | G06F 3/0647 |
| 2021/0326047 A1* | 10/2021 | Sillifant | G06F 11/2028 |
| 2022/0283716 A1* | 9/2022 | Shilane | G06F 3/0653 |
| 2023/0342276 A1* | 10/2023 | Dar | G06F 11/3075 |
| 2024/0045698 A1 | 2/2024 | Stabler et al. | |
| 2024/0069614 A1* | 2/2024 | Hiregoudar | G06F 3/0625 |

OTHER PUBLICATIONS

Non-Final Office Action mailed on Jul. 18, 2024 for U.S. Appl. No. 18/115,353, filed Feb. 28, 2023, 18 pages.
Notice of Allowance mailed on Jul. 11, 2025 for U.S. Appl. No. 18/115,353, filed Feb. 28, 2023, 10 pages.

\* cited by examiner

Workload Type Power Table 202

| Access Type 206 | Technology 208 | Energy Consumption (J) | Response Time (ms) | IOPS |
|---|---|---|---|---|
| Random Access | SSD | 0.850 | 3.162 | 1246.690 |
| | HDD | 2.937 | 17.248 | 231.897 |
| | Hybrid | 6.179 | 8.636 | 926.000 |
| Sequential Access | SSD | 2.055 | 36.901 | 108.396 |
| | HDD | 3.580 | 21.299 | 187.793 |
| | Hybrid | 10.734 | 14.173 | 564.599 |
| Mixed | SSD | 1.571 | 10.862 | 368.226 |
| | HDD | 3.089 | 19.711 | 202.922 |
| | Hybrid | 6.639 | 11.746 | 681.211 |

Operation Size Power Table 212

| Operation Type 216 | Operation Size 218 | Operation Type | Drive Type 220 | |
|---|---|---|---|---|
| | | | 1 TB HDD Power (W) | 120 GB SSD Power (W) |
| Write | 4 kB | Random | 0.0102094 | 0.0008643 |
| | | Sequential | 0.0003109 | 0.0001321 |
| | 1 MB | Random | 0.0411532 | 0.0328646 |
| | | Sequential | 0.0229215 | 0.0075362 |
| Read | 4 kB | Random | 0.0252030 | 0.0004737 |
| | | Sequential | 0.0001598 | 0.0001919 |
| | 1 MB | Random | 0.0455828 | 0.0086180 |
| | | Sequential | 0.0183449 | 0.0081872 |

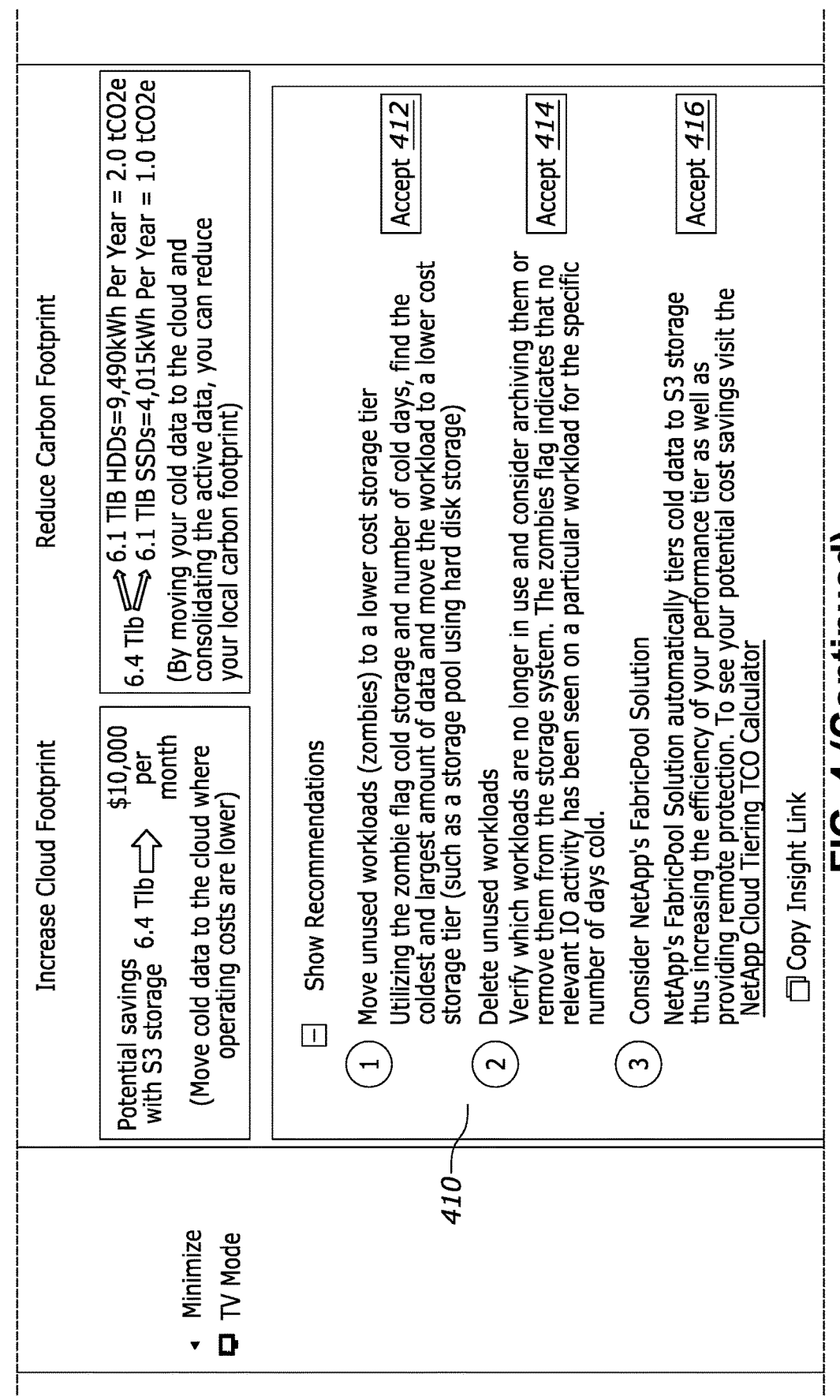

- Minimize
- ☐ TV Mode

Increase Cloud Footprint

Potential savings    $10,000
with S3 storage  6.4 TIb ⇨    per
                              month (Move cold data to the cloud where operating costs are lower)

Reduce Carbon Footprint

6.4 TIb ⇔ 6.1 TIB HDDs=9,490kWh Per Year = 2.0 tCO2e
        ⇔ 6.1 TIB SSDs=4,015kWh Per Year = 1.0 tCO2e (By moving your cold data to the cloud and consolidating the active data, you can reduce your local carbon footprint)

☐ Show Recommendations

410

① Move unused workloads (zombies) to a lower cost storage tier

Utilizing the zombie flag cold storage and number of cold days, find the coldest and largest amount of data and move the workload to a lower cost storage tier (such as a storage pool using hard disk storage)

Accept 412

② Delete unused workloads

Verify which workloads are no longer in use and consider archiving them or remove them from the storage system. The zombies flag indicates that no relevant IO activity has been seen on a particular workload for the specific number of days cold.

Accept 414

③ Consider NetApp's FabricPool Solution

NetApp's FabricPool Solution automatically tiers cold data to S3 storage thus increasing the efficiency of your performance tier as well as providing remote protection. To see your potential cost savings visit the NetApp Cloud Tiering TCO Calculator Accept 416

☐ Copy Insight Link

FIG. 4 (Continued)

Workloads With Cold Data (215)

▽Filter...

| Workloads | # Days cold | Total Size (GB) | Cold Data (GB) | Is Zombie | Disk Type | Cloud Recommendation |
|---|---|---|---|---|---|---|
| ⊞ wlName1 | 140 Days (about 4 and a half months) | 500 | 500 | True | SSD | Tier |
| ⊞ wlName2 | 140 Days (about 4 and a half months) | 1,400 | 100 | False | SSD | No Action |
| ⊞ wlName3 | 140 Days (about 4 and a half months) | 100 | 20 | False | SSD | No Action |
| ⊞ wlName4 | 140 Days (about 4 and a half months) | 300 | 300 | True | HDD | Tier |
| wlName5 | 140 Days (about 4 and a half months) | 100 | 100 | True | HDD | Tier |
| ⊞ wlName6 | 84 Days (about 3 and a half months) | 800 | 200 | False | SSD | Tier |
| wlName8 | 84 Days (about 3 and a half months) | 200 | 100 | False | SSD | Tier |
| wlName9 | 84 Days (about 3 and a half months) | 100 | 100 | True | SSD | Tier |
| wlName10 | 84 Days (about 3 and a half months) | 50 | 50 | True | HDD | Tier |

406

GUI 402

FIG. 4 (Continued)

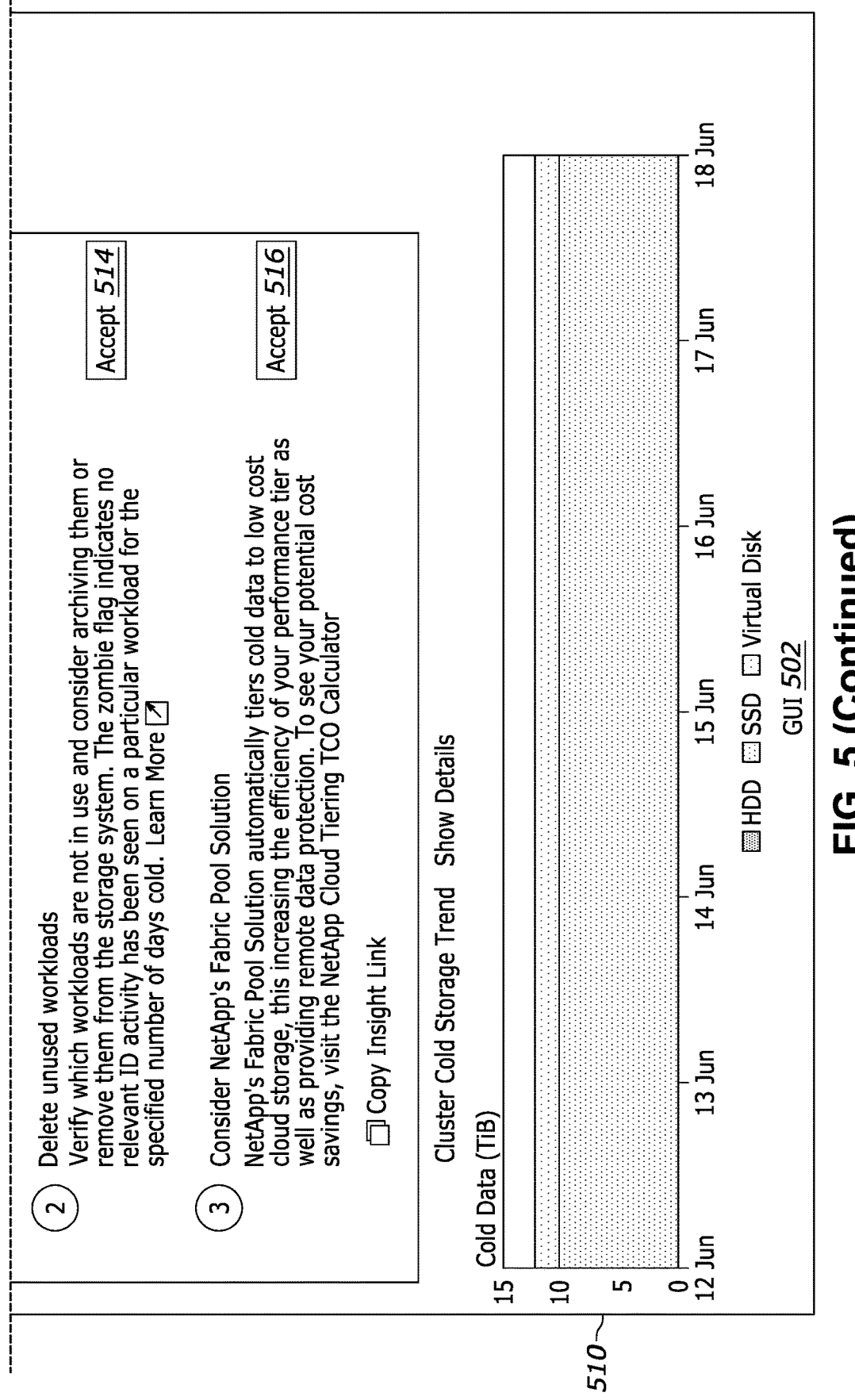

2  Delete unused workloads
   Verify which workloads are not in use and consider archiving them or remove them from the storage system. The zombie flag indicates no relevant ID activity has been seen on a particular workload for the specified number of days cold. Learn More ⬀

Accept *514*

3  Consider NetApp's Fabric Pool Solution
   NetApp's Fabric Pool Solution automatically tiers cold data to low cost cloud storage, this increasing the efficiency of your performance tier as well as providing remote data protection. To see your potential cost savings, visit the NetApp Cloud Tiering TCO Calculator ☐ Copy Insight Link Accept *516*

Cluster Cold Storage Trend   Show Details

Cold Data (TiB)

15

10

5

0

12 Jun   13 Jun   14 Jun   15 Jun   16 Jun   17 Jun   18 Jun

▨ HDD  ▨ SSD  ☐ Virtual Disk

GUI *502*

| Workloads | Average Power (kW) | Average IOPS/Watts | Average Watts/TB | Potential Savings (kW) | Node Model | Disk Type | Recommendation |
|---|---|---|---|---|---|---|---|
| ⊞ wlName1 | 1.1 | 0.4 | 323 | 0.8 | FAS 8700 | SSD | Change Cluster |
| ⊞ wlName2 | 0.5 | 10.1 | 0.3 | 0.4 | FAS 8700 | SSD | Change Cluster |
| wlName3 | 0.3 | 3.4 | 0.3 | 0.4 | FAS 8700 | SSD | Change Node |
| ⊞ wlName4 | 0.8 | 1.1 | 0.3 | 0.4 | FAS 8300 | HDD | Change Node |
| wlName5 | 0.7 | 2.1 | 532 | 0.4 | FAS 8300 | HDD | Use SSD |
| ⊞ wlName6 | 0.4 | 14.3 | 0.3 | 0.2 | FAS 8300 | SSD | Adjust Schedule |
| wlName8 | 0.9 | 12.3 | 0.3 | 0.5 | FAS 8300 | SSD | Adjust Schedule |
| wlName9 | 0.7 | 0.3 | 0.3 | 0.3 | FAS 8700 | SSD | Change Cluster |
| wlName10 | 0 | 0 | 0.5 | 0.5 | FAS 8700 | HDD | Change Cluster |

706

GUI 702

FIG. 7 (Continued)

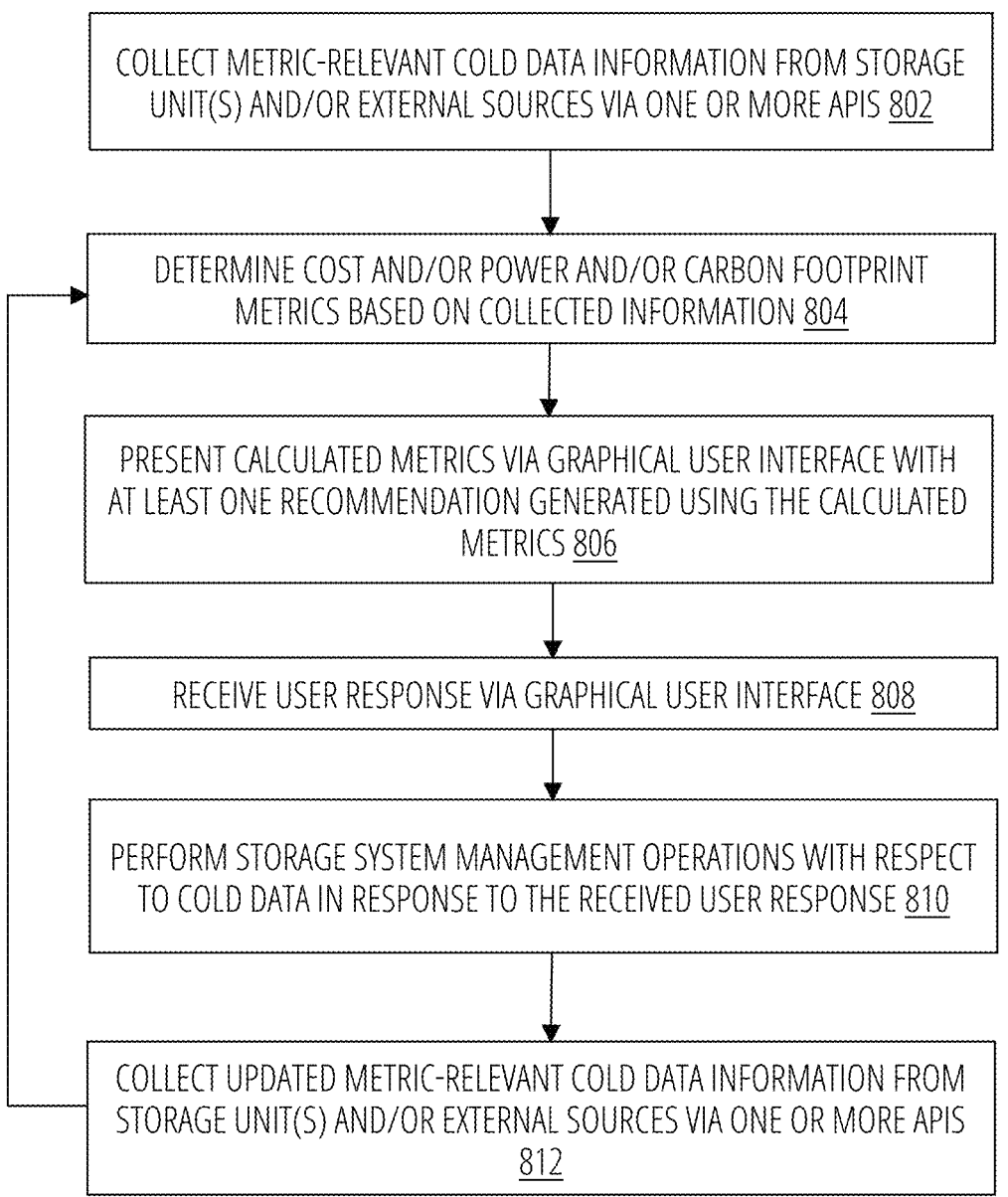

COLLECT METRIC-RELEVANT COLD DATA INFORMATION FROM STORAGE UNIT(S) AND/OR EXTERNAL SOURCES VIA ONE OR MORE APIS 802

DETERMINE COST AND/OR POWER AND/OR CARBON FOOTPRINT METRICS BASED ON COLLECTED INFORMATION 804

PRESENT CALCULATED METRICS VIA GRAPHICAL USER INTERFACE WITH AT LEAST ONE RECOMMENDATION GENERATED USING THE CALCULATED METRICS 806

RECEIVE USER RESPONSE VIA GRAPHICAL USER INTERFACE 808

PERFORM STORAGE SYSTEM MANAGEMENT OPERATIONS WITH RESPECT TO COLD DATA IN RESPONSE TO THE RECEIVED USER RESPONSE 810

COLLECT UPDATED METRIC-RELEVANT COLD DATA INFORMATION FROM STORAGE UNIT(S) AND/OR EXTERNAL SOURCES VIA ONE OR MORE APIS 812

FIG. 8

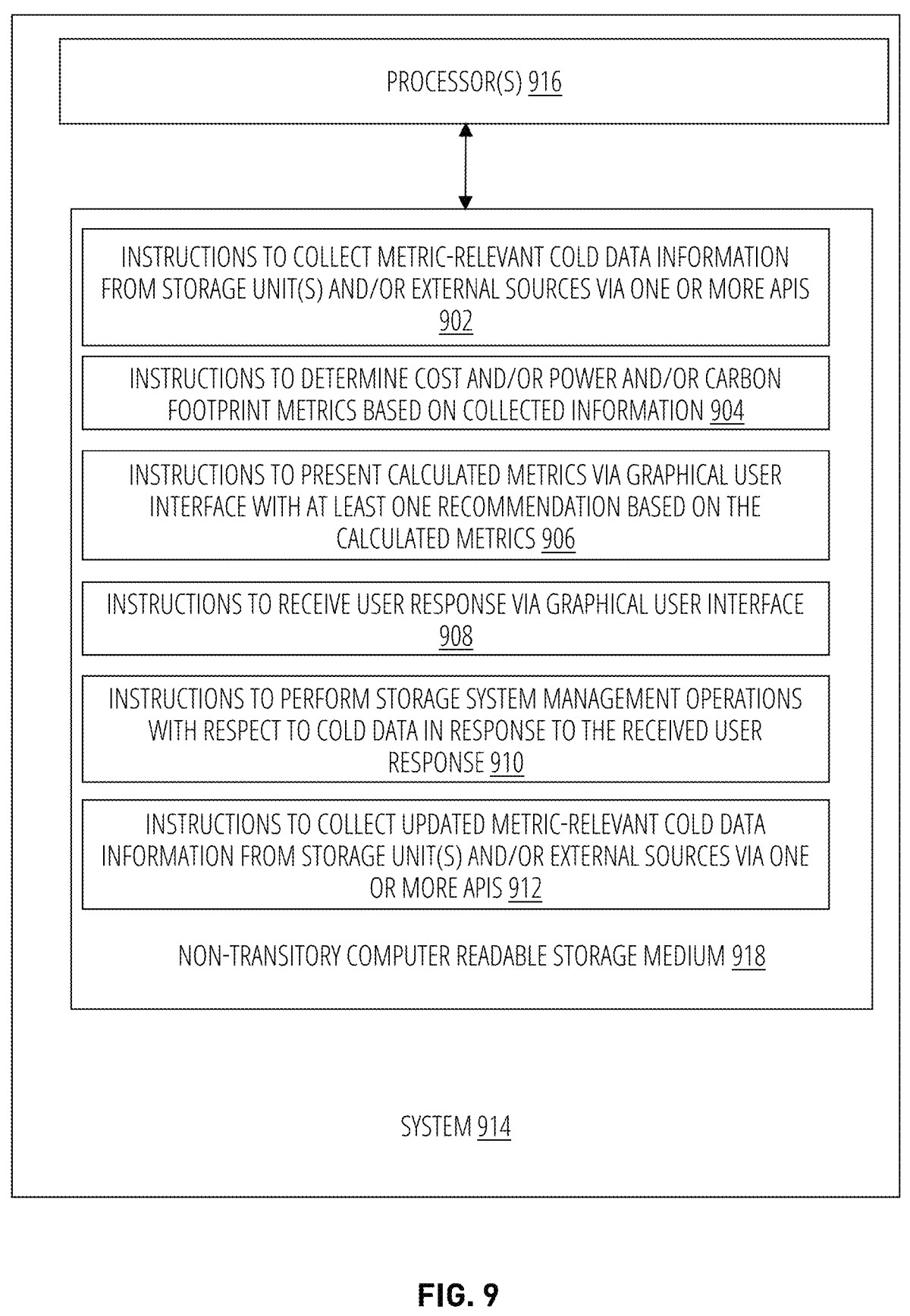

PROCESSOR(S) 916

INSTRUCTIONS TO COLLECT METRIC-RELEVANT COLD DATA INFORMATION FROM STORAGE UNIT(S) AND/OR EXTERNAL SOURCES VIA ONE OR MORE APIS 902

INSTRUCTIONS TO DETERMINE COST AND/OR POWER AND/OR CARBON FOOTPRINT METRICS BASED ON COLLECTED INFORMATION 904

INSTRUCTIONS TO PRESENT CALCULATED METRICS VIA GRAPHICAL USER INTERFACE WITH AT LEAST ONE RECOMMENDATION BASED ON THE CALCULATED METRICS 906

INSTRUCTIONS TO RECEIVE USER RESPONSE VIA GRAPHICAL USER INTERFACE 908

INSTRUCTIONS TO PERFORM STORAGE SYSTEM MANAGEMENT OPERATIONS WITH RESPECT TO COLD DATA IN RESPONSE TO THE RECEIVED USER RESPONSE 910

INSTRUCTIONS TO COLLECT UPDATED METRIC-RELEVANT COLD DATA INFORMATION FROM STORAGE UNIT(S) AND/OR EXTERNAL SOURCES VIA ONE OR MORE APIS 912

NON-TRANSITORY COMPUTER READABLE STORAGE MEDIUM 918

SYSTEM 914

FIG. 9

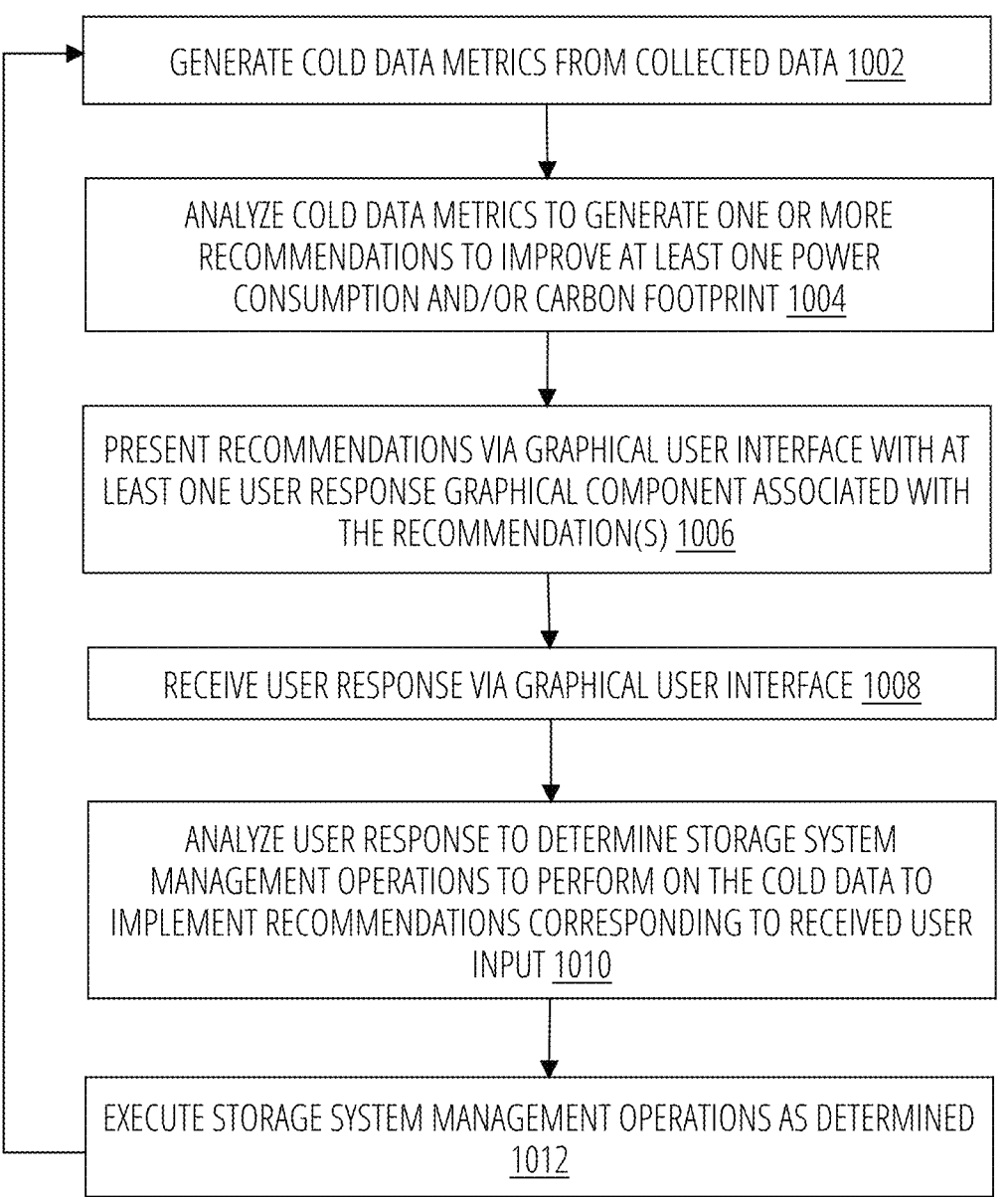

GENERATE COLD DATA METRICS FROM COLLECTED DATA 1002

ANALYZE COLD DATA METRICS TO GENERATE ONE OR MORE RECOMMENDATIONS TO IMPROVE AT LEAST ONE POWER CONSUMPTION AND/OR CARBON FOOTPRINT 1004

PRESENT RECOMMENDATIONS VIA GRAPHICAL USER INTERFACE WITH AT LEAST ONE USER RESPONSE GRAPHICAL COMPONENT ASSOCIATED WITH THE RECOMMENDATION(S) 1006

RECEIVE USER RESPONSE VIA GRAPHICAL USER INTERFACE 1008

ANALYZE USER RESPONSE TO DETERMINE STORAGE SYSTEM MANAGEMENT OPERATIONS TO PERFORM ON THE COLD DATA TO IMPLEMENT RECOMMENDATIONS CORRESPONDING TO RECEIVED USER INPUT 1010

EXECUTE STORAGE SYSTEM MANAGEMENT OPERATIONS AS DETERMINED 1012

FIG. 10

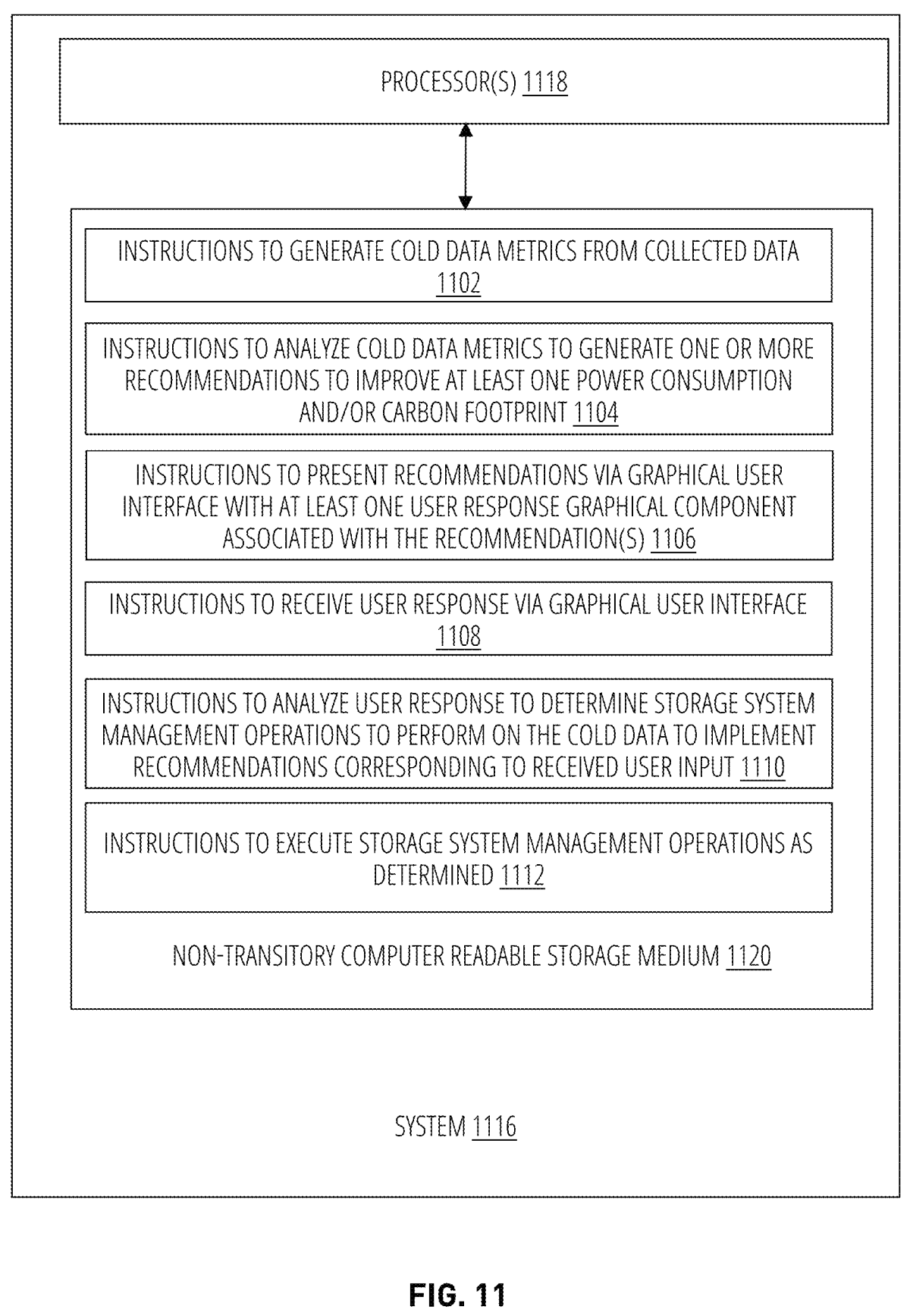

PROCESSOR(S) 1118

INSTRUCTIONS TO GENERATE COLD DATA METRICS FROM COLLECTED DATA 1102

INSTRUCTIONS TO ANALYZE COLD DATA METRICS TO GENERATE ONE OR MORE RECOMMENDATIONS TO IMPROVE AT LEAST ONE POWER CONSUMPTION AND/OR CARBON FOOTPRINT 1104

INSTRUCTIONS TO PRESENT RECOMMENDATIONS VIA GRAPHICAL USER INTERFACE WITH AT LEAST ONE USER RESPONSE GRAPHICAL COMPONENT ASSOCIATED WITH THE RECOMMENDATION(S) 1106

INSTRUCTIONS TO RECEIVE USER RESPONSE VIA GRAPHICAL USER INTERFACE 1108

INSTRUCTIONS TO ANALYZE USER RESPONSE TO DETERMINE STORAGE SYSTEM MANAGEMENT OPERATIONS TO PERFORM ON THE COLD DATA TO IMPLEMENT RECOMMENDATIONS CORRESPONDING TO RECEIVED USER INPUT 1110

INSTRUCTIONS TO EXECUTE STORAGE SYSTEM MANAGEMENT OPERATIONS AS DETERMINED 1112

NON-TRANSITORY COMPUTER READABLE STORAGE MEDIUM 1120

SYSTEM 1116

FIG. 11

COLD DATA STORAGE ENERGY CONSUMPTION EVALUATION AND RESPONSE

CROSS-REFERENCE TO RELATED APPLICATION(S)

This application is a continuation-in-part application of U.S. patent application Ser. No. 18/115,353, filed Feb. 28, 2023, entitled "STORAGE DEVICE ENERGY CONSUMPTION EVALUATION AND RESPONSE," by Gregory Eugene Stabler, et al., which claims the priority of U.S. Provisional Application No. 63/394,830, filed Aug. 3, 2022, entitled "STORAGE DEVICE ENERGY CONSUMPTION EVALUATION AND RESPONSE," by Gregory Eugene Stabler, et al. the contents of both are incorporated by reference herein.

TECHNICAL FIELD

Examples provided herein relate to monitoring and evaluating energy consumption by one or more computing resources. More particularly, examples provided herein related to assessment of energy consumption by storage units in complex computing environments to determine improvements in efficiencies and/or configurations.

BACKGROUND

When configuring or maintaining computing environments (e.g., data centers) various characteristics are evaluated and monitored. These characteristics can include, for example, cold data management, resource consumption, and other metrics, which can be expected to be maintained within specified ranges. It is often desirable to have information related to resource consumption when configuring and/or maintaining computing environments.

BRIEF DESCRIPTION OF THE DRAWINGS

The present disclosure is best understood from the following detailed description when read with the accompanying figures.

FIG. 2A is a table of example power consumption for various workload types.

FIG. 2B is a table of example power consumption for various operation sizes.

FIG. 8 is a flow diagram for one technique for evaluation of and response to metrics corresponding to data storage systems storing cold data.

FIG. 9 is a block diagram of one example of a processing system that can provide evaluation of and response to metrics corresponding to data storage systems storing cold data.

FIG. 10 is a flow diagram for one technique for evaluation of and response to cold data metrics corresponding to data storage systems.

FIG. 11 is a block diagram of one example of a processing system that can provide evaluation of and response to cold data metrics corresponding to data storage systems.

Figure 1:
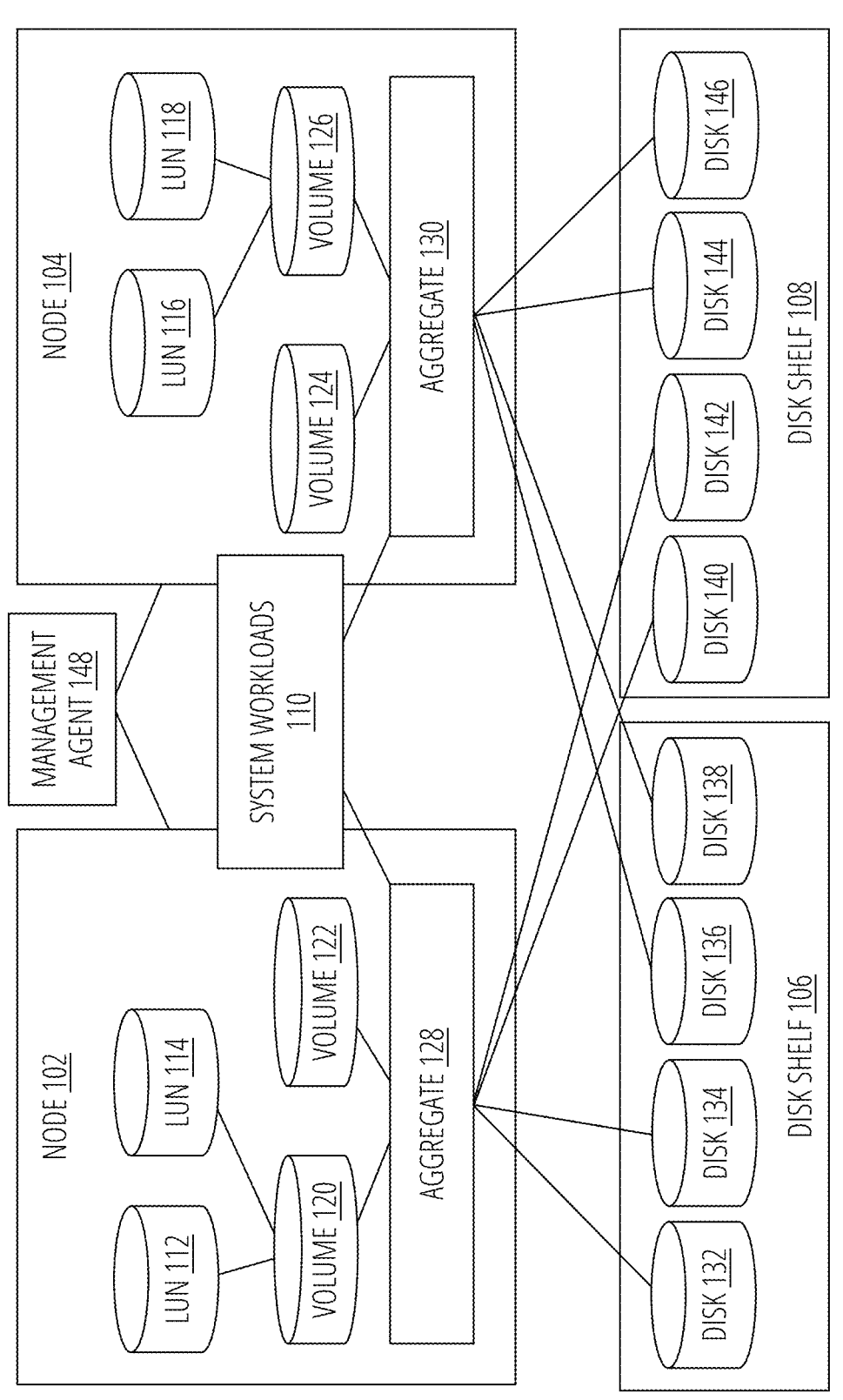
FIG. 1 is a block diagram of an example computing system where cold data and storage unit energy consumption can be monitored and utilized for management and/or configuration purposes.

The drawings have not necessarily been drawn to scale. Similarly, some components and/or operations may be separated into different blocks or combined into single blocks for the purposes of discussion of some embodiments of the present technology. Moreover, while the technology is amenable to various modifications and alternate forms, specific embodiments have been shown by way of example in the drawings and are described in detail below. The intention, however, is not to limit the technology to the particular embodiments described or shown. On the contrary, the technology is intended to cover all modifications, equivalents, and alternatives falling within the scope of the technology as defined by the appended claims.

DETAILED DESCRIPTION

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

As discussed above, when configuring and/or managing computing environments techniques and approaches described below can provide functionality to utilize power-based metrics, capacity-based metrics and/or carbon footprint-based metrics for management of storage resources (e.g., one or more components of a distributed storage system, one or more components of a data center) within a computing environment. For example, a storage administrator can be enabled to make decisions and/or implement changes based on power utilization/consumption ramifications. Further, recommendations and/or streamlined reconfiguration operations can be implemented based on power recommendations. That is, power optimization and power usage ramifications can be used to manage configuration and/or operation of one or more storage system resources.

More specifically, the following example use cases provide situations in which the approaches described might be utilized. Additional use cases can also be supported. A storage system administrator may desire capacity optimization information for storage arrays that have significant cold data and may wish to evaluate potential coast savings that could come from moving data to cloud storage (or other storage device) to achieve potential power savings. The administrator could be provided with, for example, one or more storage tier recommendations for volumes that are good candidates to move to cloud storage (or other storage solution). The recommendations can include a power savings component, a "greenness" component (described in greater detail below), a capacity optimization component, additional components, and/or a combination thereof.

As a second example use case, a storage system administrator may wish to monitor which volumes in a datacenter have been inactive (aka "zombie" volumes), what is cold data capacity of one or more volumes, how long the data has been cold on the volumes, etc. One or more recommendations can be provided to the system administrator based on the gathered data. The recommendations can include a power savings component, a "greenness" component (described in greater detail below), a capacity optimization component, additional components, and/or a combination thereof.

Various mechanisms and workflows are described that can utilize cold data, power, capacity and/or carbon footprint-based metrics to manage storage unit usage and/or configuration, which can provide a more efficient and environmentally friendly computing environment. In some example configurations, storage system management mechanisms collect power consumption information for storage devices (e.g., individual drives, storage shelves, nodes, clusters) and can utilize the power consumption information with other storage unit characteristics to generate power, capacity and/or carbon footprint metrics. This power consumption information can be combined with cold data information to provide improved recommendations and/or management operations with respect to cold data storage. Example approaches are described in greater detail below.

In some operating environments, the cost of different types of power (e.g., coal powered, solar, nuclear, hydro, wind, wave power), can be a function of time. Similarly, the "greenness" of power sources may be a function of time, for example, solar power may not be available during certain times. In the examples that follow, real-time telemetry can be utilized to provide power cost and/or power carbon footprint values. In alternative example, static power and/or carbon footprint values may be sufficient.

In an example, the recommendations (or insights) created can be at the storage cluster level showing relevant metrics, including at least cold data capacity, potential cost/power savings based on the recommendations, etc. In an example, the recommendations (or insights) can include a list of workloads with cold capacity or other related metrics for prioritizing workloads to be addressed/modified.

FIG. 1 is a block diagram of an example computing system where cold data and storage unit energy consumption can be monitored and utilized for management and/or configuration purposes. The example computing system of FIG. 1 includes two nodes and two disk shelves; however, any number of nodes and disk shelves can be supported. Management agent 148 provides device and system management functionality as described herein. In an example, management agent 148 includes at least a component or layer of ONTAP software available from NetApp, Inc. of Sunnyvale, CA. Other storage management systems can also be supported. In an example, management agent 148 can provide one or more of the cold data metrics/evaluations, power-based metrics, capacity-based metrics and/or carbon footprint-based metrics for management of storage resources and/or management agent 148 can provide recommendations and/or streamlined reconfiguration operations can be implemented based on power recommendations (and/or other recommendations). Further example functionalities that can be provided by management agent 148 are described in greater detail below.

In various examples nodes (e.g., node 102, node 104) can be interconnected with one or more disk shelves (e.g., disk shelf 106, disk shelf 108), which can include any number of physical disks. Nodes may service read requests, write requests, or both received from one or more clients devices (not illustrated in FIG. 1) or via system workloads 110. Management mechanisms that can be used with nodes are described in greater detail below.

As illustrated in FIG. 1, an LUN (e.g., LUN 112, LUN 114, LUN 116, LUN 118) is a logical representation of a storage unit. In an example, a LUN can appear as a hard disk (or similar storage unit) to a client device and can appear as a file inside a volume (e.g., volume 120, volume 122, volume 124, volume 126). Aggregates (e.g., aggregate 128, aggregate 130) are representations of storage space that can be utilized and/or managed by the management mechanisms described below. In an example, an aggregate can represent storage space provided by one or more RAID (Redundant Array of Independent Disks) arrays that can be provided by, for example, the disks of disk shelf 106 and disk shelf 108.

In the example of FIG. 1, disk shelf 106 includes disk 132, disk 134, disk 136 and disk 138, and disk shelf 108 includes disk 140, disk 142, disk 144 and disk 146. Further in the example of FIG. 1, aggregate 128 of node 102 is coupled with disk 132 and disk 134 in disk shelf 106, and with disk 140 and disk 142 in 108. Similarly, aggregate 130 of node 104 is coupled with disk 136 and disk 138 in disk shelf 106, and with disk 144 and disk 146 in disk shelf 108. Other configurations can also be supported.

Each of the various storage units consumes energy during operation. As described in greater detail below, storage system monitoring mechanisms (e.g., management agent 148 and/or other system components) can monitor nodes of a storage cluster and calculate power consumption for various storage units (e.g., disks) or groups of storage units (e.g., disk shelves, nodes, clusters). The calculated power consumption information can be utilized for management and/or for configuration purposes.

In an example, cold data and/or power consumption information can be acquired by utilizing one or more application program interfaces (APIs) to communicate with one or more storage units, groups of storage units, nodes, clusters, management systems, etc. One example of an API that can be used for this purpose is provided in FIG. 13 (e.g., 1322). Other API configurations can also be utilized to acquire power consumption information.

In an example, cold data, power and current information can be obtained via APIs and/or other mechanisms and then power consumption metrics, capacity metrics and/or carbon footprint metrics can be determined. Specific example approaches to determining these metrics are provided below. In some examples, the power information may be normalized to account for various differences in data source (e.g., power determined at the power supply, power determined other than at the power supply). Normalization can be used between the various metrics.

In some examples, the determined metrics can be provided to a user/administrator through dashboards presented via one or more graphical user interfaces (GUIs). Two example metrics that can be provided (or used to determine other metrics) can be input/output operations per second (IOPS) per Watt (i.e., IOPS/Watt) and Watts per storage capacity (e.g., Watts/TB, Watts/MB, Watts/PB).

The IOPS/Watt metric can provide insight into power consumption in terms of throughput, and the Watts/TB metric can be useful in comparing systems. Carbon footprint metrics can be determined from either or both metrics. Thus, use of these two metrics can allow, for example, comparison between different storage shelves. Further, these metrics can be used at the cluster or node level to determine cluster or node level metrics. As another example, these metrics may be used to compare workloads. Additional and/or different metrics can also be utilized.

Using the metrics described herein, management and forecasting can be performed at the device, cluster, node, aggregate, workload and/or data center level. In an example, power consumption can be calculated for one or more disk shelves (e.g., disk shelf 106, disk shelf 108) and for one or more nodes (e.g., node 102, node 104). In some examples, metrics for nodes and disk shelves can be combined to determine cluster power consumption. For controllers with integrated disk shelves, the node power can include the integrated disk shelf.

In some examples, machine learning (ML) techniques and analytics techniques can be used to recommend, for example, certain workloads be tiered to cloud storage because they may not be actively involved in processing input/output (I/O) traffic, yet still contributing to the carbon footprint of the spinning disk. As part of this type of recommendation, an estimate of the power savings and/or carbon footprint savings that can be achieved can be presented to a user or administrator.

Specific example approaches to determining power savings are provided; however, alternate approaches could also be supported. In an example, power savings can be calculated as:

$$Power\ Savings = \frac{Cold\ Data\ Capacity\ (TB)}{Number\ of\ 1TB\ Disks} * Avg\ Power\ of\ 1TB\ Disk$$

The average power of a 1-TB disk can be obtained from a manufacturer specification, for example. This example approach uses the power of a 1 TB disk as an estimate because, for cold data at rest, the individual disk power consumption is difficult to determine. Alternate estimates can also be used.

The power savings can be converted to a carbon footprint savings, for example, based on carbon emission rate per megawatt-hour information from reputable sources (e.g., EPA.gov). In some examples, users may be allowed to enter or edit carbon emission rate information.

As another approach to determine power savings, first average power consumed by each disk can be determined:

$$Disk\ Power = \frac{Storage\ Shelf\ Power}{Number\ of\ Disks}$$

More discrete approaches can be used to consider mixed disk types like HDD or SSD and RAID positioning to weight the power consumption. The aggregate disk power can then be calculated:

Aggregate Power=Σ(Disk Power)

by summing the disk power for all relevant disks. Then the power savings can be calculated:

$$Power\ Savings = \frac{Cold\ Data\ Capacity\ (TB)}{Aggregate\ Total\ Capacity} * Aggregate\ Power$$

Figure 4:
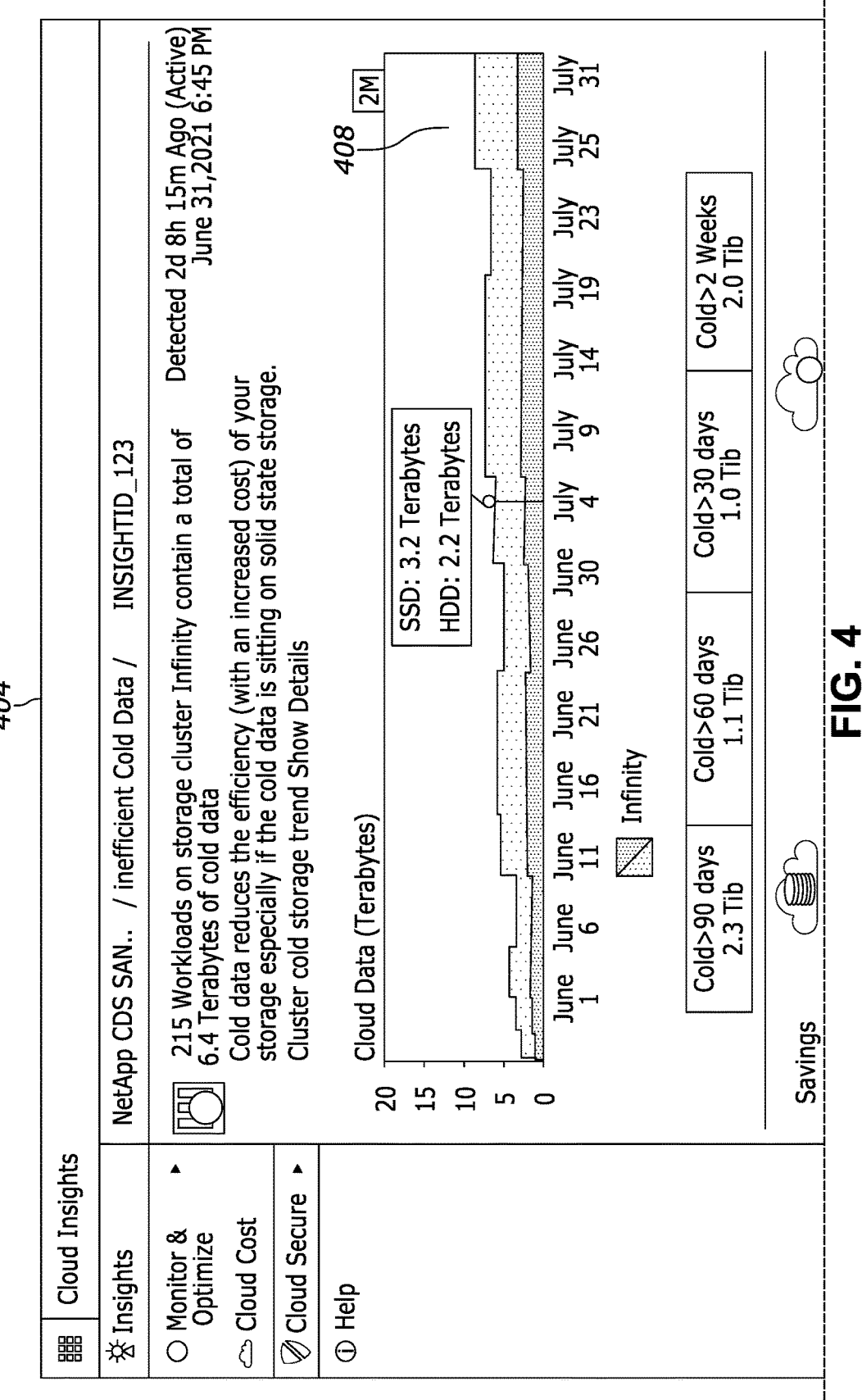
FIG. 4 is an example graphical user interface dashboard that can provide power metric and/or carbon footprint metric trend information with respect to reconfiguration of cold storage.
Figure 5:
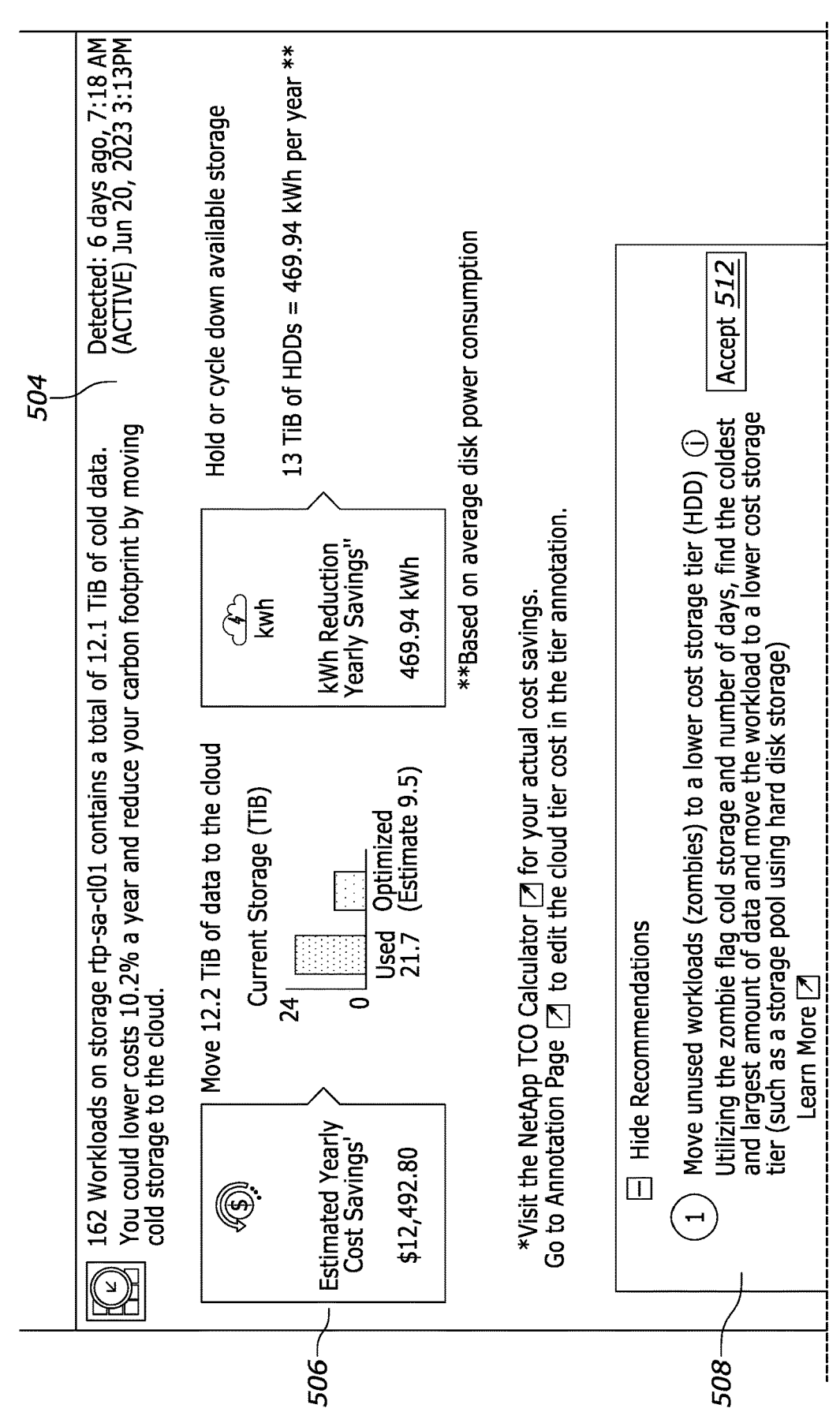
FIG. 5 is an example graphical user interface dashboard that can provide power metric and/or carbon footprint metric trend information with respect to reconfiguration of cold storage.

The power savings can then be converted to carbon footprint savings. An example GUI for presenting cold data analysis with associated power savings and/or carbon footprint savings is illustrated in FIG. 4 and FIG. 5.

The example GUIs (or comparable GUIs) can be used to present the power savings and/or carbon footprint savings information to a user. In other examples, additional and/or different metrics can be presented. For example, end of life (or early replacement) of devices can be analyzed and estimated to determine if updated replacement strategies would result in improved power savings and/or carbon footprint savings.

In other example approaches, storage tier power consumption can be calculated based on power consumption by each aggregate (e.g., aggregate 128, aggregate 130). This can be accomplished by estimating disk power based on the IOPS processed by each disk:

Storage Shelf Total IOPS=Σ(Disk Total IOPS)

by summing total IOPS for all relevant disks. Disk power can be calculated as:

$$Disk\ Power = \frac{Disk\ Total\ IOPS}{Storage\ Shelf\ Total\ IOPS} * Storage\ Shelf\ Power$$

If the Storage Shelf Total IOPS is zero, the shelf power can be distributed to every disk evenly because idle disks still consume power. Aggregate power can be determined as:

Aggregate Power=Σ(Disk Power)

by summing the disk power for all relevant disks. Then the tier power can be calculated as:

Tier Power=Σ(Aggregate Power)

by summing all aggregates for the same tier. After determining the storage tier power, an analysis of power consumption for each storage tier and which aggregates are consuming the most power in the tier can be provided via a dashboard or other interface. Aggregates can be ranked, for example based on IOPS/Watt and Watts per storage capacity so that a user can determine which aggregates (e.g., aggregate 128, aggregate 130) are least efficient. Further, for each aggregate, the interface can provide metrics associated with the busiest workloads based on, for example, IOPS or throughput. Recommendations can be provided based on this analysis.

When determining the power consumption metrics described herein different power consumption values can be used for read, write and idle because disks consume power differently depending on what operations are being performed. Thus, differentiating operations by read, write and idle can provide a more accurate and useful analysis and corresponding recommendations.

FIG. 2A is a table of example power consumption for various workload types. Workloads can also consume power differently depending on whether the workloads are random, sequential or mixed workloads. Workload type power table 202 provides example values illustrating potential differences in power consumption for different access type 206

(e.g., random access, sequential access, mixed) and for different device technology 208 (e.g., Solid State Drive (SSD), Hard Disk Drive (HDD), Hybrid).

When determining the power consumption metrics described herein different power consumption values can be used based on access type and/or technology because disks consume power differently depending on the type of memory technology being utilized and the type of access being made. Thus, differentiating operations by access type 206 and/or technology 208 can provide a more accurate and useful analysis and corresponding recommendations.

FIG. 2B is a table of example power consumption for various operation sizes. Workloads can also consume power differently depending on operation type (e.g., read, write) and request size (e.g., 4 kB, 1 MB). Operation size power table 212 provides example values illustrating potential differences in power consumption for different operation type 216 (e.g., write, read), operation size 218, and for different drive type 220 (e.g., 1 TB HDD, 120 GB SSD).

When determining the power consumption metrics described herein different power consumption values can be used based on operation type, workload size and/or drive type because disks consume power differently depending on the type of memory technology being utilized and the size and type of operation being performed. Thus, differentiating operations by operation type 216, operation size 218 and/or drive type 220 can provide a more accurate and useful analysis and corresponding recommendations.

Various approaches can be used to determine workload power. In an example, workload power can be estimated by apportioning shelf and node power based on workload IOPS. In one example approach differences in I/O operation size and I/O operation characteristics are ignored and all disks are assumed to be of the same type. In another example approach one or more lower-level differences (e.g., I/O operation size, I/O operation characteristics, disk type) are considered as part of the power consumption evaluation process.

In an example, for shelf power, the aggregate power approach described above can be utilized:

$$\text{Aggregate Power} = \Sigma(\text{Disk Power})$$

by summing the disk power for all relevant disks. A workload's Aggregate Power can be determined by:

$$\text{Workload Aggregate Power} = \frac{\text{Workload Total } IOPS}{\text{Aggregate Total } IOPS} * \text{Aggregate Power}$$

In an example, for Workload Total IOPS the IOPS that have been served by a management mechanism cache may be excluded. A workload's Node Power can be determined by:

$$\text{Workload Node Power} = \Sigma\left(\frac{\text{Workload Total } IOPS}{\text{Node Total } IOPS} * \text{Node Power}\right)$$

summed for all nodes. In an example, for Node Total IOPS, both user-defined and system workloads can be included. Workload Power can be calculated as:

$$\text{Workload Power} = \text{Workload Aggregate Power} + \text{Workload Node Power}$$

With the determination of workload power consumption, IOPS/Watt for each workload can be determined to find which workloads are least efficient and to make recommendations for relocating the least efficient workloads. In an example, IOPS/Watt can be calculated as:

$$IOPS \text{ per Watt} = \frac{\text{Workload Total } IOPS}{\text{Workload Power}}$$

In an example, as part of workload power analysis, the power consumption for each aggregate and each node can be calculated. The workloads that have the lowest IOPS/Watt (i.e., least efficient workloads) can be identified and recommendations can be made to increase workload efficiency, for example, by moving the workload to a different device. As described with respect to FIG. 3, FIG. 4, FIG. 5 and FIG. 7 recommendations can be made via a dashboard or other interface mechanism and implementation of the recommendations can be performed by management mechanisms in response to a user accepting the recommendations (e.g., accept suggestion 304 button, accept button 412, accept 512 button, accept button 712).

For example, if an inefficient workload is running on a HDD, that workload could be moved to an aggregate that uses SSDs to reduce power consumption. The recommendation can be based on an aggregate's IOPS/Watt and or Watts per storage capacity to identify more efficient aggregates. As another example, some nodes may have lower IOPS/Watt because they are newer and have more efficient hardware or are less utilized. Workloads with high IOPS/Watt can be moved to these nodes to improve workload IOPS/Watt.

As another example, some workloads are periodic in nature (e.g., scheduled jobs, backups). These periodic workloads can be scheduled for a time when a node is less busy to reduce peak power consumption of the node.

In another example, efficiency and/or carbon footprint can be determined based on capacity rather than IOPS/Watt. In an example, for shelf power, the aggregate power approach described above can be utilized:

$$\text{Aggregate Power} = \Sigma(\text{Disk Power})$$

by summing the disk power for all relevant disks. A workload's Aggregate Power can be determined by:

$$\text{Workload Aggregate Power} =$$
$$\frac{\text{Workload Total Capacity}}{\text{Aggregate Total Capacity}} * \text{Aggregate Power}$$

In an example, a workload's Node Power can be determined by:

$$\text{Workload Node Power} = \Sigma\left(\frac{\text{Workload Total Capacity}}{\text{Node Total Capacity}} * \text{Node Power}\right)$$

summed for all nodes. Workload Power can be calculated as:

$$\text{Workload Power} = \text{Workload Aggregate Power} + \text{Workload Node Power}$$

With the determination of workload power consumption, relevant capacity for each workload can be determined to find which workloads are least efficient and to make recommendations for relocating the least efficient workloads. In an example, workload capacity can be calculated as:

$$\text{Workload Capacity} = \frac{\text{Workload Total Capacity}}{\text{Workload Power}}$$

In an example, as part of workload power analysis, the power consumption for each aggregate and each node can be calculated. The workloads that have the lowest capacity (i.e., least efficient workloads) can be identified and recommendations can be made to increase workload efficiency, for example, by moving the workload to a different device. As described with respect to FIG. 3, FIG. 4, FIG. 5 and FIG. 7 recommendations can be made via a dashboard or other interface mechanism and implementation of the recommendations can be performed by management mechanisms in response to a user accepting the recommendations (e.g., accept suggestion 304 button, accept button 412, accept 512 button, accept button 712).

Figure 3:
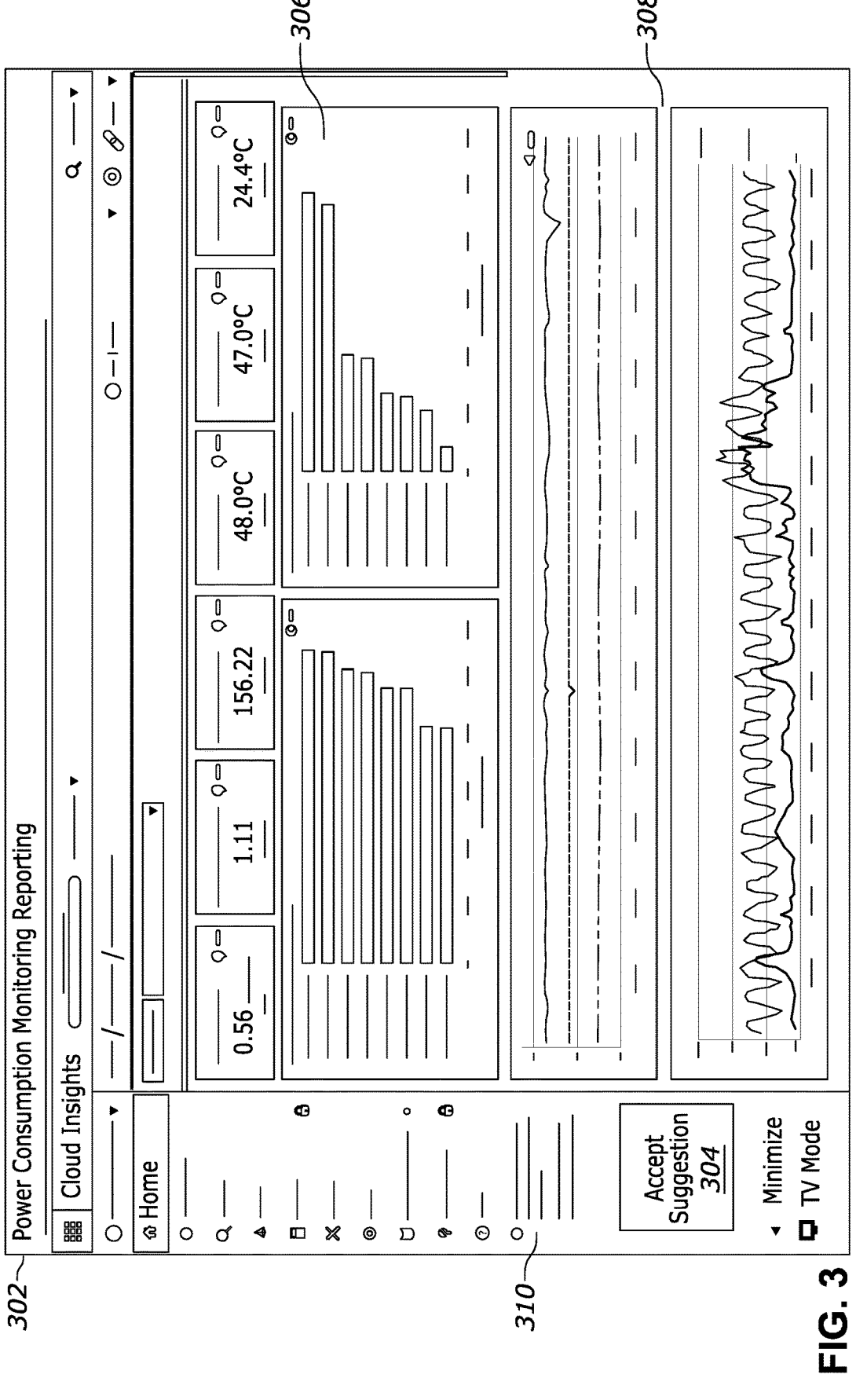
FIG. 3 is an example graphical user interface dashboard that can provide power metric and/or carbon footprint metric information.

FIG. 3 is an example graphical user interface dashboard that can provide power metric and/or carbon footprint metric information. Example dashboard 302 as illustrated in FIG. 3 is one example and is based on collection of metrics to generate and respond to alerts based on, for example, power consumption and/or carbon footprint metrics.

In an example, metrics can be presented as a historical set of data for one or more devices (or groups of devices) 306, and/or metrics can be presented as a comparison between different devices (or groups of devices) 308. In some examples, temperature information can be collected to determine one or more metrics associated with operation of the monitored storage units.

In some examples, temperature information can include one or more of a temperature corresponding to a storage unit, a temperature corresponding to an enclosure having a storage unit, a temperature of a computing resource (e.g., processor, GPU), a temperature corresponding to a room within a lab or data center. Temperature information can be used, for example, to evaluate operating conditions in the lab/data center as part of a carbon footprint metric. For example, a evaluation can be performed to determine if a change to the operating temperature of the lab/data center would improve or diminish operation of components (e.g., storage units, nodes) within the lab/data center.

In some examples, example dashboard 302 can include one or more suggestions or recommendations 310 to improve operational efficiency of the monitored devices and storage systems based on the metrics being utilized. Example suggestions or recommendations can include, for example, one or more of: moving data from a currently used drive to a different drive, putting drives to sleep, putting nodes to sleep, performing certain operations or data migrations during specified times (e.g., schedule changes), changing heating, ventilation and air conditioning (HVAC) settings in a lab, room or data center. These are a few sample suggestions and recommendations that can be made based on the determined metrics. Additional and/or different types of suggestions and recommendations can also be provided.

In some examples, example dashboard 302 can include one or more accept suggestion 304 buttons (only one accept suggestion 304 illustrated in FIG. 3). The accept suggestion 304 button can allow a user to accept a suggestion (or recommendation) presented via example dashboard 302 and have the accepted suggestion automatically implemented. In an example with multiple accept suggestion buttons, a list (or other presentation) of recommendations/suggestions can be provided with corresponding buttons.

In an example, analysis of the utilized metrics may indicate that data should be moved from a currently utilized disk shelf to a more efficient disk shelf during a generally low use time and during a time in which the relevant data centers are being powered via renewable energy sources. If an administrator agrees with the suggestion, they can use accept suggestion 304 button to cause the suggestion to be implemented by the various management mechanisms that manage operation of the relevant storage units.

As another example, evaluation of operation of one or more power supplies and control systems corresponding to storage systems with respect to the ambient temperature of the room in which they reside may result in a suggestion that the temperature of the room can be increased (i.e., reduced air cooling), which can result in a smaller carbon footprint. Acceptance of the suggestion via accept suggestion 304 button can result in the temperature of the room being automatically changed (or the heating/cooling schedule changed). These are but a few example suggestions that can be presented and/or accepted via example dashboard 302. Many other suggestions and recommendations can be presented and accepted via similar dashboards.

FIG. 4 is an example graphical user interface dashboard that can provide power metric and/or carbon footprint metric trend information with respect to reconfiguration of cold storage. Example cold storage recommendation dashboard 404 as illustrated in FIG. 4 is one example and is based on collection of metrics to generate trend information based on, for example, power consumption and/or carbon footprint metrics for cold storage management.

In an example, metrics can be presented as historical data 406 as well as cold data trends 408 for one or more devices (or groups of devices). The metrics presented in example cold storage recommendation dashboard 404 in GUI 402 can include, for example, IOPS/Watt, Watts per storage capacity, temperature and/or additional metrics. In some examples, example cold storage recommendation dashboard 404 can include one or more suggestions/recommendations 410 to improve operational efficiency of the monitored storage devices and storage systems based on the metrics being utilized. Temperature information can also be included in the metrics presented in example cold storage recommendation dashboard 404.

In some examples, example cold storage recommendation dashboard 404 can include one or more accept buttons (e.g., accept button 412, accept button 414, accept button 416). The accept buttons can allow a user to accept a corresponding suggestion/recommendation (e.g., one or more of suggestions/recommendations 410) presented via example cold storage recommendation dashboard 404 and have the accepted suggestion(s) automatically implemented. If an administrator agrees with the suggestion, they can use an accept button to cause the suggestion to be implemented by the various management mechanisms that manage operation of the relevant storage units.

FIG. 5 is an example graphical user interface dashboard that can provide power metric and/or carbon footprint metric trend information with respect to reconfiguration of cold storage. In an example, various trigger conditions can be based on utilization of a threshold. For example, at the cluster level, a recommendation can triggered/presented at a preselected threshold (e.g., 5% of used capacity is cold, 10% of used capacity is cold) and the amount of cold data exceeds a preselected threshold (e.g., 1 TB, 2 TB, 2.5 TB).

In an example, a cost savings associated with moving cold data can be determined using the Tier Power, and Yearly Cost per GB formulas described above. Because some cloud parameters from third party cloud providers may not be known, estimates can be utilized with the option to allow a user to override the estimates provided. In an example, default values can be based on the relationship between cost savings in dollar terms and cold data capacity and/or the relationship between cost savings in percentage terms and the cost savings in dollar terms. In an example, the following formulas can be used to calculate cost savings:

$$\text{Cost Saving }\$ = (CapacityUsed \times PercentCold/100 \times CostSaving\$PerTBCold)$$

In an example, the cost savings in monetary amount (e.g., CostSaving$, above) to cost saving percent ratio can be determined based on the relationship (e.g., slope) between cost savings and cold data capacity and the cost savings per memory block (e.g., TB) of cold data plus some intercept value where the intercept value can be adjusted based on characteristics of the memory storage provider.

In an example, to calculate power cost savings, the average power per TB of disk capacity is determined for a storage cluster. In an example, for each storage shelf, the storage shelf power can be determined from current and voltage supplied to the storage shelf. In the ONTAP example mentioned above, the current and voltage can be obtained from ONTAP. In other examples, shelf power can be determined in another way. The number of solid-state drives (SSDs) and hard disk drives (HDDs) and the total capacity of each disk type is also determined for each storage shelf.

The weighted average power per disk can be determined with the above information. In an example, the weighted average power is used because HDDs consume more power than SDDs (e.g., according to current estimates, HDDs consume 8.6 Watts per TB and SDDs consume 6 Watts per TB; future estimates will vary). Thus, in an example, when using weighted average power, HDDs can be expected to consume 1.4 times as much power as SDDs.

The shelf average power can be calculated with the information above. After calculating shelf average values, cluster level averages can be calculated. Periodic estimates (e.g., shelf consumption per quarter, annual cluster consumption) can then be determined and used for analysis and/or generation of recommendations (as illustrated in, for example, FIG. 4 and/or FIG. 5). The analysis and/or recommendations can be, for example, a time-series chart showing the distribution of cold data by disk media-type— SSD, HDD and virtual disks. The chart can, for example, show datapoints over the last 30 days so that customers can verify whether the cold data has been consistently cold and is worth tiering off to cloud or move the cold on SSDs to low-cost drives.

As another example, the analysis and/or recommendations can include a chart showing the distribution of data by the number of days data was cold. The cold data could be counted in one of four time buckets, Cold data >30 days, Cold data >60 days, Cold data >90 days, Cold data >120 days, etc. Other configurations and/or distributions can also be provided. This information can provide insights and help identify extreme cases—such as if majority of data is more than 120 days cold then it will not be needed soon and makes sense to free up the local performance tier for hot data, etc.

Figure 6:
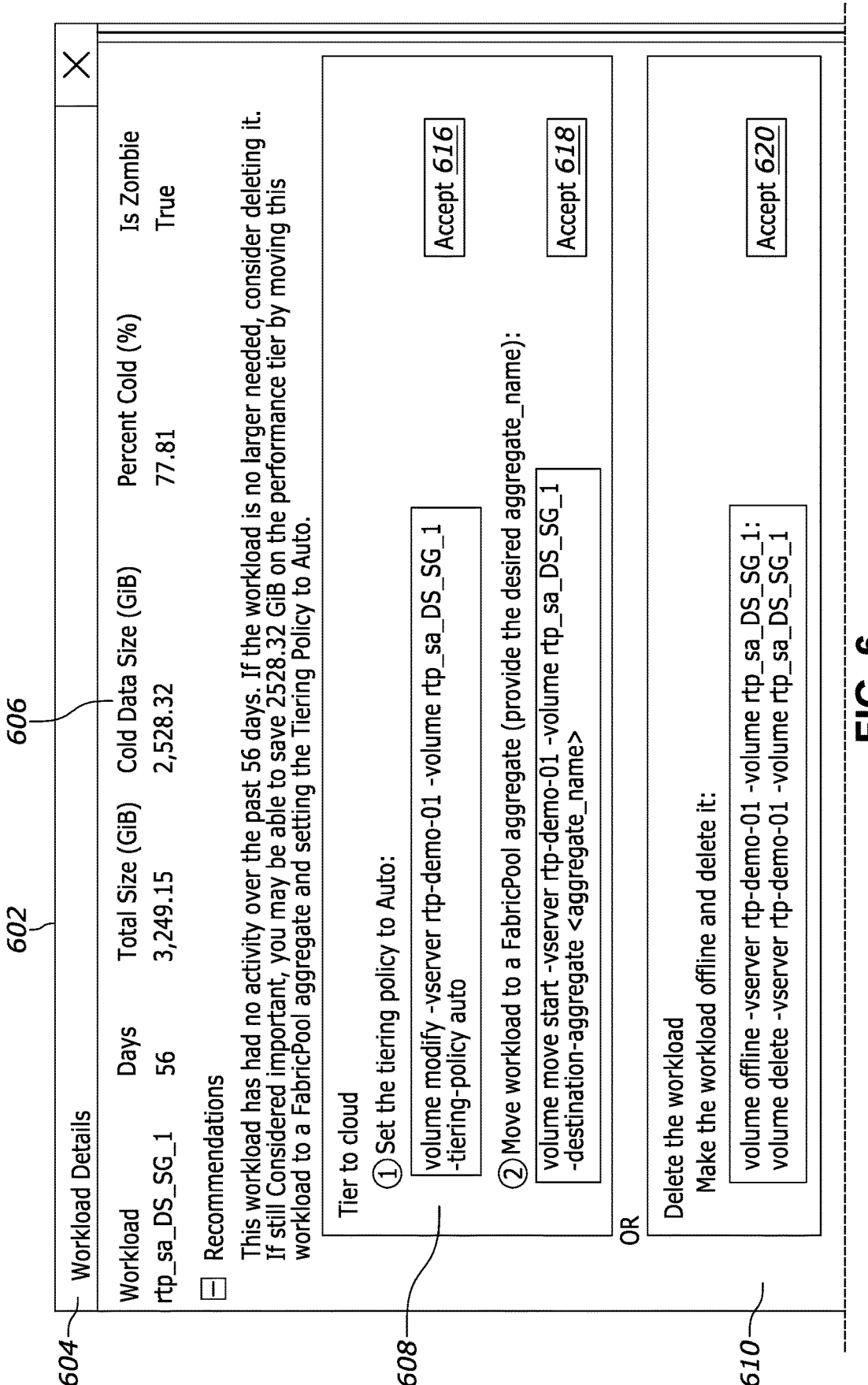
FIG. 6 illustrates an example GUI that can provide information related to cold workloads and can be accompanied by actionable steps and/or recommendations for optimizing the cold data and save costs.
Figure 6:
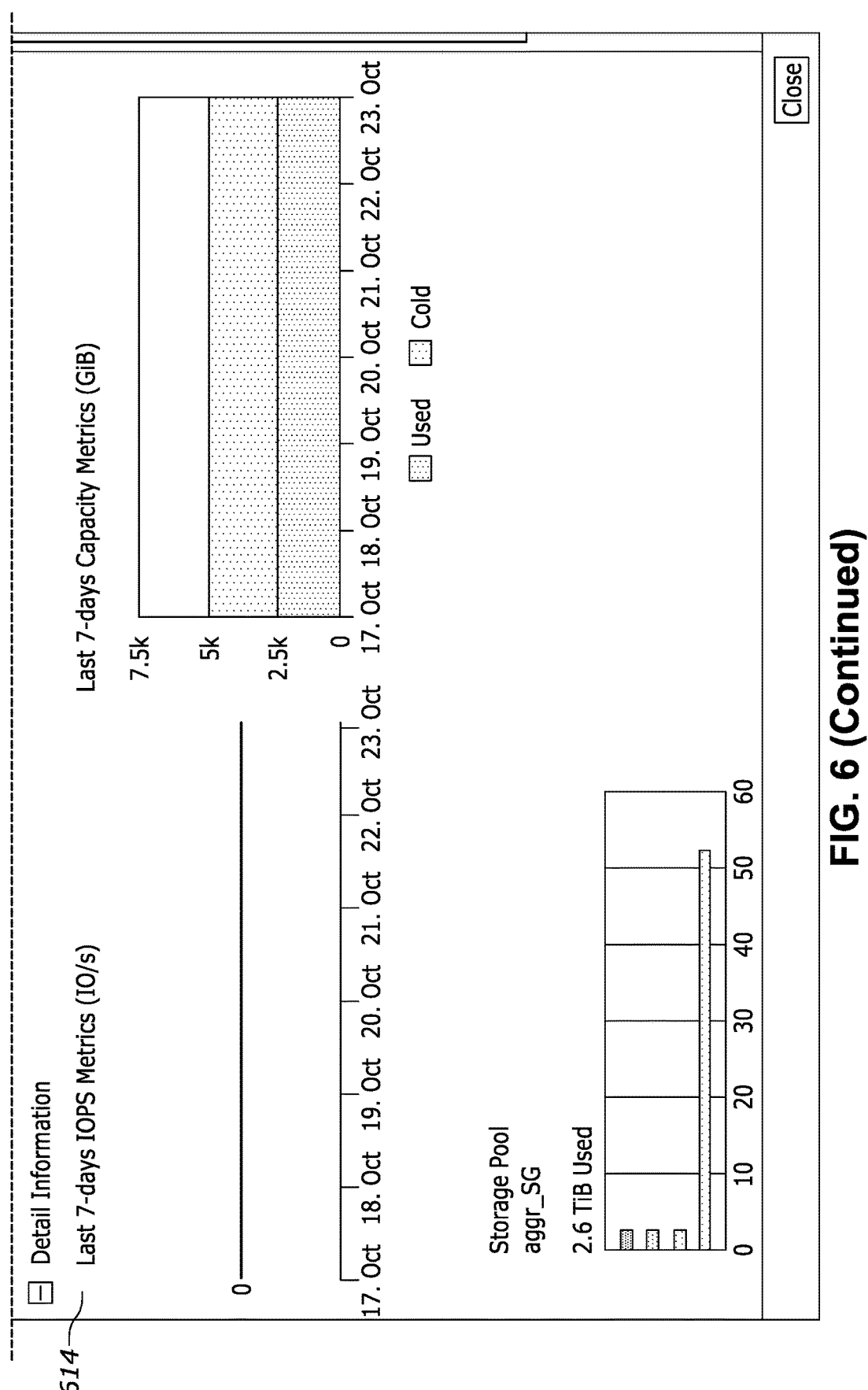

FIG. 6 illustrates an example GUI that can provide information related to cold workloads and can be accompanied by actionable steps and/or recommendations for optimizing the cold data and save costs. In an example, machine learning (ML) jobs can be used to calculate cold data metrics periodically (e.g., daily) and push them to a data lake or other storage structure where these metrics can also stored and used for analysis and/or recommendations for a top set of cold workloads (e.g., 200 cold workloads) and each of these cold workloads can be accompanied by actionable steps and/or recommendations for optimizing the cold data and save costs an example of which is illustrated in FIG. 6.

In the example of FIG. 6, GUI 602 provides workload details 604, which further includes cold data information 606. One example is illustrated in FIG. 6, but in other examples, additional and/or different workload details and cold data information could be provided. GUI 602 can further provide recommendation 608 and recommendation 610 based on analysis of workload details 604, cold data information 606 and/or other data using, for example, one or more of the approaches described above. GUI 602 further includes one or more accept buttons (e.g., accept button 616, accept button 618, accept button 620) corresponding to recommendations (or to portions of recommendations).

The example of FIG. 6 includes two recommendations; however, any number of recommendations can be provided. Additionally, recommendations can be prioritized or otherwise ranked as part of presentation via GUI 602. In an example, GUI 602 can also include historical information 614 that may be of use to a user of GUI 602.

Figure 7:
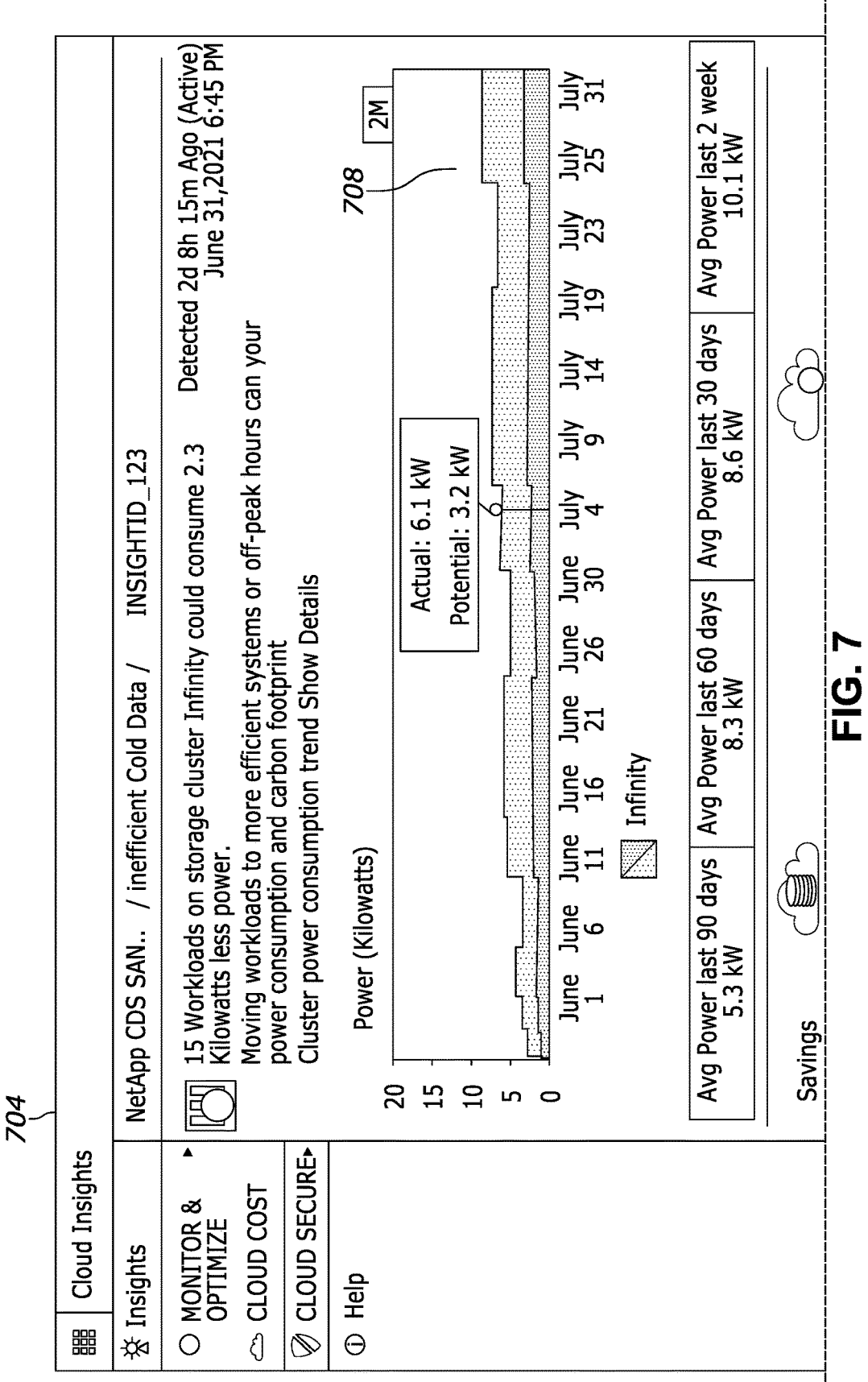
FIG. 7 is an example graphical user interface dashboard that can provide power metric and/or carbon footprint metric trend information with respect to reconfiguration of storage resources.
Figure 7:
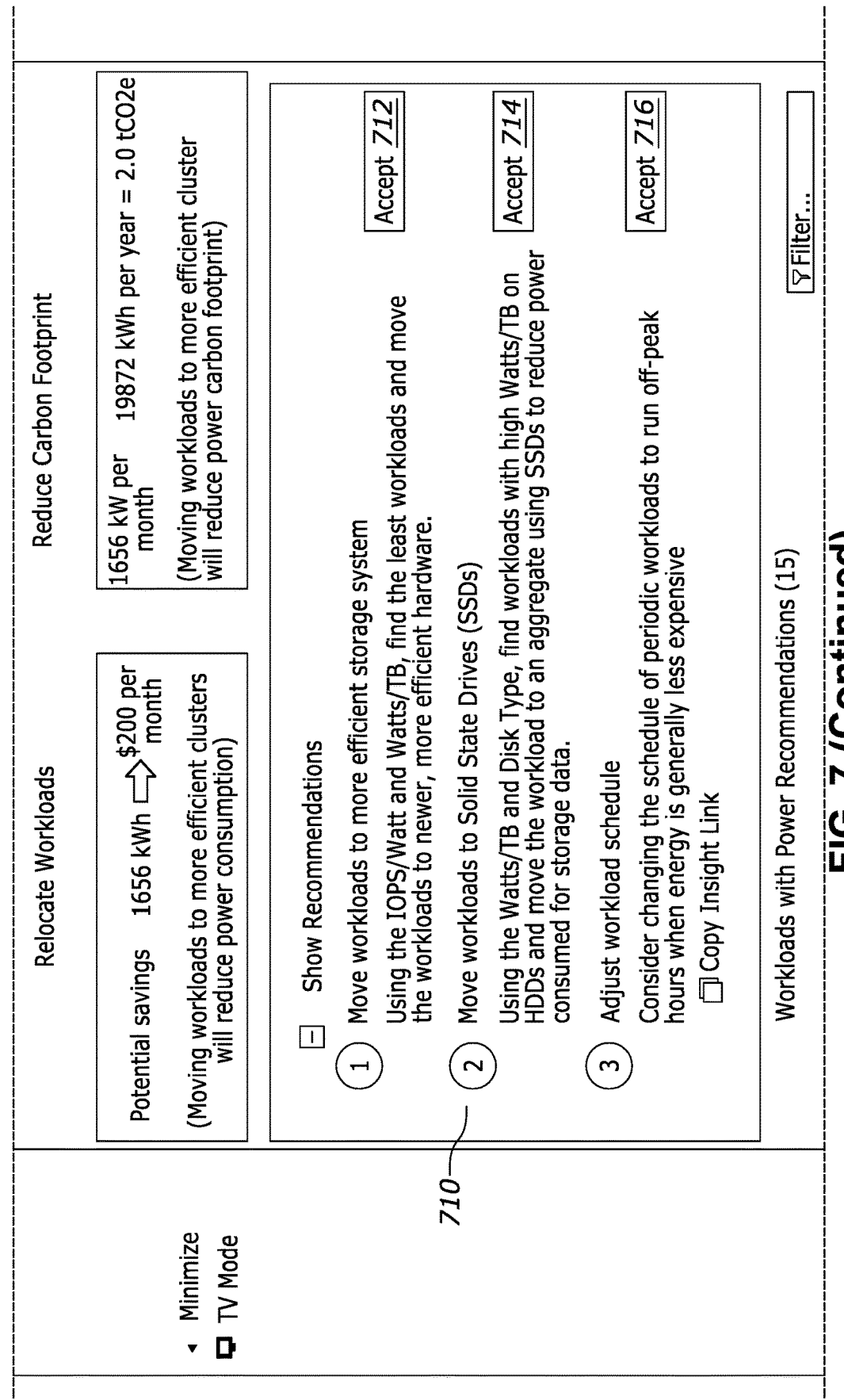

FIG. 7 is an example graphical user interface dashboard that can provide power metric and/or carbon footprint metric trend information with respect to reconfiguration of storage resources. Example storage device recommendation dashboard 704 as illustrated in FIG. 7 is one example and is based on collection of metrics to generate trend information based on, for example, power consumption and/or carbon footprint metrics for storage unit management.

In an example, metrics can be presented as historical data 706 as well as trends 708 for one or more devices (or groups of devices). The metrics presented in example storage device recommendation dashboard 704 in GUI 702 can include, for example, IOPS/Watt, Watts per storage capacity, temperature and/or additional metrics. In some examples, example storage device recommendation dashboard 704 can include one or more suggestions/recommendations 710 to improve operational efficiency of the monitored storage devices and storage systems based on the metrics being utilized. Temperature information can also be included in the metrics presented in example storage device recommendation dashboard 704.

In some examples, example storage device recommendation dashboard 704 can include one or more accept buttons (e.g., accept button 712, accept button 714, accept button 716). The accept buttons can allow a user to accept suggestions/recommendations 710 and have the accepted suggestion automatically implemented. If an administrator agrees with the suggestion, they can use an accept button to cause the suggestion to be implemented by the various management mechanisms that manage operation of the relevant storage units.

FIG. 8 is a flow diagram for one technique for evaluation of and response to metrics corresponding to data storage systems storing cold data. The example technique of FIG. 8 can be provided, for example, by management agent 148 or other system having storage management functionality.

Metric-relevant cold data information is collected from storage unit(s) and/or external sources via one or more APIs, block 802. As discussed above, information (e.g., cold data storage, power usage, device type, workload characteristics) can be gathered from storage units (e.g., SSD, HDD, Hybrid) and/or from remote sources (e.g., device specifications). In an example, temperature information can also be gathered.

Power and/or carbon footprint metrics are determined, block 804. The power and/or carbon footprint metrics can be determined using one or more of the example approaches described above. In an example, at least a portion of the power and/or carbon footprint metrics are determined based on cold data information that has been gathered.

Calculated metrics with at least one recommendation based on the calculated metrics are presented via a graphical user interface, block 806. In an example, the recommendation(s) can be generated using machine learning techniques. Metrics can be provided via dashboards (e.g., example dashboard 302, example cold storage recommendation dashboard 404, example cold storage recommendation dashboard 504 example storage device recommendation dashboard 704) presented on one or more graphical user interfaces.

Recommendations can be based on calculated metrics that can be compared to one or more of desired metrics related to cold data, corresponding metrics of other components/systems in the environment, etc. Multiple recommendations can be made based on each set of metrics, for example, to provide optimal performance, improved performance, optimal carbon footprint, improved carbon footprint, etc.

A user response is received via the graphical user interface, block 808. User response can be, for example, activating a button (e.g., accept suggestion 304, accept 514 button, accept button 412, accept button 712) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all of the proposed recommendations. As another example, recommendations can be presented and left to the user to execute.

Storage system management operations are performed in response to the received user response, block 810. In an example, management agent 148 can perform operations to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

Updated metric-relevant cold data information is collected from storage unit(s) and/or external sources via one or more APIs, block 812. Updated information can be collected based on changes implemented to provide updated metrics. The metric determination process including generation of recommendations and implementation of the recommendations (e.g., 804 through 812) can be repeated.

In a container-based system (examples of which are described in greater detail below), one or more containers can run with in a Kubernetes (K8s) cluster within one or more virtual machines. Kubernetes is an open source container orchestration architecture for managing application deployment and management. Kubernetes can be utilized with container tools such as Docker (or other similar tools) to manage containers. Kubernetes is available from the Cloud Native Computing Foundation and Docker is a virtualization and container tool available from Docker, Inc. One virtual machine can function as the Kubernetes cluster master. Alternative, non-Kubernetes embodiments can also be supported. Similarly, alternative, non-Docker embodiments can also be supported.

In an example, a Kubernetes job can be managed by a machine learning management service that can be configured to run periodically (e.g., daily, every 10 hours, every hour). The job can be configured to analyze collected data and generate suggestions and/or recommendations with respect to storage capacity, device usage, cold data, carbon footprint, energy consumption, etc.

FIG. 9 is a block diagram of one example of a processing system that can provide evaluation of and response to metrics corresponding to data storage systems storing cold data. In one example, system 914 can be part of a distributed computing platform (e.g., distributed computing platform 1204). In other examples, system 914 can be part of a virtual storage system (e.g., virtual storage system 1404).

In an example, system 914 can include processor(s) 916 and non-transitory computer readable storage medium 918. Non-transitory computer readable storage medium 918 may store instructions 902, 904, 906, 908, 910 and 912 that, when executed by processor(s) 916, cause processor(s) 916 to perform various functions. Examples of processor(s) 916 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 918 include tangible media such as random-access memory (RAM), read-only memory (ROM), electrically erasable programmable read-only memory (EEPROM), flash memory, a hard disk drive, etc.

Instructions 902 cause processor(s) 916 to collect metric-relevant information from storage unit(s) and/or external sources via one or more APIs. As discussed above, information (e.g., power usage, device type, workload characteristics, cold data) can be gathered from storage units (e.g., SSD, HDD, Hybrid) and/or from remote sources (e.g., device specifications). Temperature information can also be gathered.

Instructions 904 cause processor(s) 916 to determine cold data, power and/or carbon footprint metrics. The power and/or carbon footprint metrics can be determined using one or more of the example approaches described above.

Instructions 906 cause processor(s) 916 to present calculated metrics via graphical user interface with at least one recommendation based on the calculated metrics. Metrics can be provided via dashboards (e.g., example dashboard 302, example cold storage recommendation dashboard 404, example cold storage recommendation dashboard 504 example storage device recommendation dashboard 704) presented on one or more graphical user interfaces.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, improved cold data storage, etc.

Instructions 908 cause processor(s) 916 to receive user response via graphical user interface. User response can be, for example, activating a button (e.g., accept suggestion 304, accept button 412, accept 512 button, accept button 712) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all the proposed recommendations. As another example, recommendations can be presented and left to the user to execute.

Instructions 910 cause processor(s) 916 to perform storage system management operations in response to the received user response. In an example, management agent 148 can perform operations to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

Instructions 912 cause processor(s) 916 to collect updated metric-relevant information from storage unit(s) and/or external sources via one or more APIs. Updated information can be collected based on changes implemented to provide updated metrics. The metric determination process including generation of recommendations and implementation of the recommendations (e.g., 904 through 912) can be repeated.

FIG. 10 is a flow diagram for one technique for evaluation of and response to cold data metrics corresponding to data storage systems. The example technique of FIG. 10 can be provided, for example, by management agent 148 or other system having storage management functionality.

Power and/or carbon footprint metrics are generated from collected data, block 1002. As discussed above, collected data (e.g., cold data, power usage, device type, workload characteristics) can be gathered from storage units (e.g., SSD, HDD, Hybrid) and/or from remote sources (e.g., device specifications). In an example, temperature information can also be gathered.

The collected metrics are analyzed to generate one or more recommendations to improve at least one metric, block 1004. The power and/or carbon footprint metrics can be determined using one or more of the example approaches described above.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, etc.

The recommendations are presented via a graphical user interface with at least graphical component associated with the recommendation(s), block 1006. Metrics can be provided via dashboards (e.g., example dashboard 302, example cold storage recommendation dashboard 404, example cold storage recommendation dashboard 504 example storage device recommendation dashboard 704) presented on one or more graphical user interfaces where the dashboards have buttons or other graphical features for accepting one or more recommendations.

A user response is received via the graphical user interface, block 1008. User response can be, for example, activating a button (e.g., accept suggestion 304, accept button 412, accept 516 button, accept button 712) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all of the proposed recommendations. As another example, recommendations can be presented and left to the user to execute.

The user response is analyzed to determine what (if any) storage system management operations to perform to implement recommendations corresponding to the user input, block 1010. In an example, management agent 148 can analyze the user input to determine what operations to perform to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

The storage system management operations can be performed (e.g., by management agent 148) to implement the recommendations accepted by the user, block 1012. Updated information can be collected based on changes implemented to provide updated metrics. The metric determination process including generation of recommendations and implementation of the recommendations (e.g., 1002 through 1012) can be repeated.

FIG. 11 is a block diagram of one example of a processing system that can provide evaluation of and response to cold data metrics corresponding to data storage systems. In one example, system 1116 can be part of a distributed computing platform (e.g., distributed computing platform 1204). In other examples, system 1116 can be part of a virtual storage system (e.g., virtual storage system 1404).

In an example, system 1116 can include processor(s) 1118 and non-transitory computer readable storage medium 1120. Non-transitory computer readable storage medium 1120 may store instructions 1102, 1104, 1106, 1108, 1110 and 1112 that, when executed by processor(s) 1118, cause processor(s) 1118 to perform various functions. Examples of processor(s) 1118 may include a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 1120 include tangible media such as random-access memory (RAM), read-only memory (ROM), electrically erasable programmable read-only memory (EEPROM), flash memory, a hard disk drive, etc.

Instructions 1102 cause processor(s) 1118 to generate power and/or carbon footprint metrics from collected data. As discussed above, information (e.g., power usage, device type, workload characteristics) can be gathered from storage units (e.g., SSD, HDD, Hybrid) and/or from remote sources (e.g., device specifications). In an example, temperature information can also be gathered.

Instructions 1104 cause processor(s) 1118 to analyze metrics to generate one or more recommendations to improve at least one metric. The power and/or carbon footprint metrics can be determined using one or more of the example approaches described above.

Recommendations can be based on calculated metrics that can be compared to one or more of desired performance metrics, corresponding metrics of other components/systems in the environment, etc. Multiple recommendations can be made based on each set of metrics, for example, to provide optimal performance, improved performance, optimal carbon footprint, improved carbon footprint, etc.

Instructions 1106 cause processor(s) 1118 to present calculated metrics via graphical user interface with at least one recommendation based on the calculated metrics. Metrics can be provided via dashboards (e.g., example dashboard 302, example cold storage recommendation dashboard 404, example cold storage recommendation dashboard 504, example storage device recommendation dashboard 704) presented on one or more graphical user interfaces where the dashboards have buttons or other graphical features for accepting one or more recommendations.

Instructions 1108 cause processor(s) 1118 to receive user response via graphical user interface. User response can be, for example, activating a button (e.g., accept suggestion 304, accept button 412, accept 512 button, accept button 712) associated with a recommendation. In other examples, recommendations can be selected from drop-down menus, pop-up menus, dialog boxes, etc.

In an example, recommendations include multiple modifications to storage system configurations. Thus, when a recommendation is accepted by a user, the multiple modifications are implemented in response to the user input. Alternatively, individual recommendations can be presented to allow a user to select a subset or all of the proposed recommendations. As another example, recommendations can be presented and left to the user to execute.

Instructions 1110 cause processor(s) 1118 to analyze the user response to determine what storage system management operations to perform to implement the recommendations accepted via user input. In an example, management agent 148 can analyze the user input to determine what operations to perform to implement recommendations approved/accepted by the user via the graphical user interface. These operations can include, for example, changes to storage system configurations (e.g., data locations, schedules), changes to operating environment settings (e.g., HVAC settings), changes to energy sources (e.g., renewable sources), etc.

Instructions 1112 cause processor(s) 1118 to execute the storage system management operations. Subsequently, updated information can be collected based on changes implemented to provide updated metrics. The metric determination process including generation of recommendations and implementation of the recommendations (e.g., 1102 through 1112) can be repeated.

Figure 12:
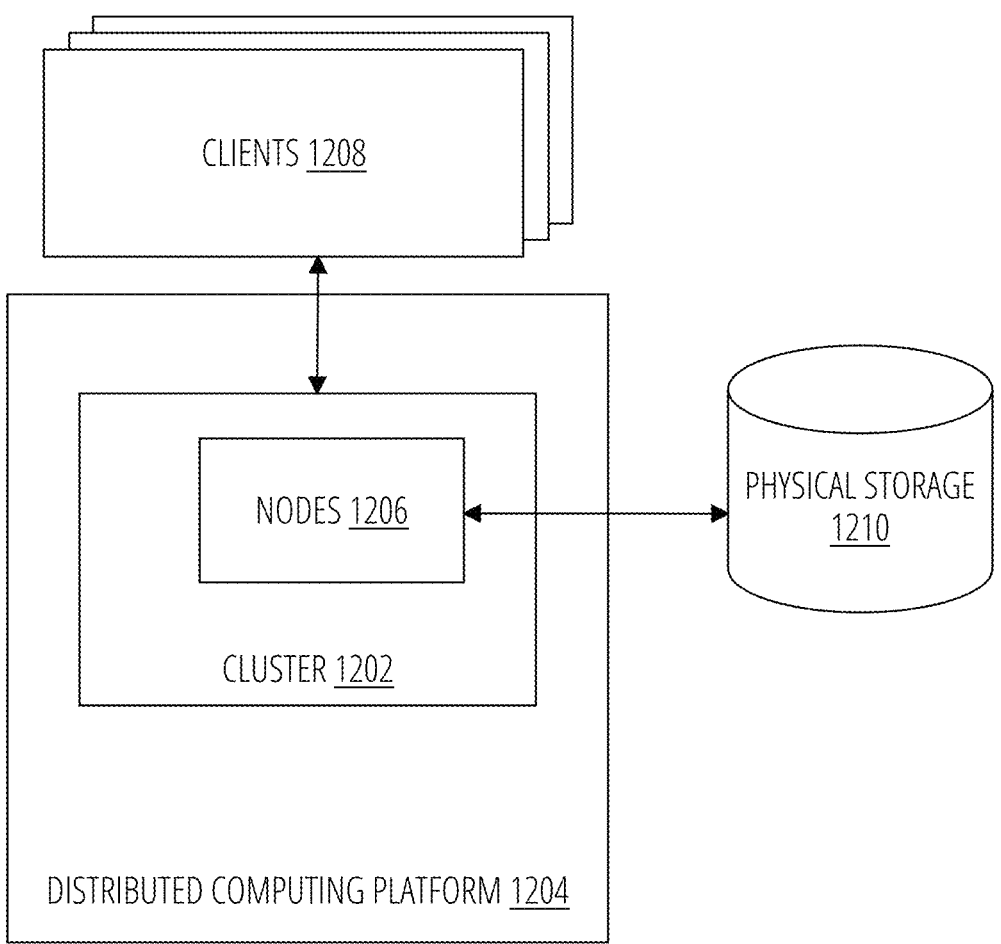
FIG. 12 is a block diagram illustrating an example of a distributed storage system in accordance with one or more embodiments.

FIG. 12 is a block diagram illustrating an example of a distributed storage system (e.g., cluster 1202) within distributed computing platform 1204 in accordance with one or more embodiments. In one or more embodiments, the distributed storage system may be implemented at least partially virtually. In the context of the present example, distributed computing platform 1204 includes cluster 1202. Cluster 1202 includes multiple nodes 1206. In one or more embodiments, nodes 1206 include two or more nodes. In an example, distributed computing platform 1204 provides the functionality of management agent 148.

Nodes 1206 may service read requests, write requests, or both received from one or more clients (e.g., clients 1208). In one or more embodiments, one of nodes 1206 may serve as a backup node for the other should the former experience a failover event. Nodes 1206 are supported by physical storage 1210. In one or more embodiments, at least a portion of physical storage 1210 is distributed across nodes 1206, which may connect with physical storage 1210 via respective controllers (not shown). The controllers may be implemented using hardware, software, firmware, or a combination thereof. In one or more embodiments, the controllers are implemented in an operating system within nodes 1206. The operating system may be, for example, a storage operating system (OS) that is hosted by the distributed storage system. Physical storage 1210 may be comprised of any number of physical data storage units. For example, without limitation, physical storage 1210 may include disks or arrays of disks, solid state drives (SSDs), flash memory, one or more other forms of data storage, or a combination thereof associated with respective nodes. For example, a portion of physical storage 1210 may be integrated with or coupled to one or more nodes 1206.

In some embodiments, nodes 1206 connect with or share a common portion of physical storage 1210. In other embodiments, nodes 1206 do not share storage. For example, one node may read from and write to a first portion of physical storage 1210, while another node may read from and write to a second portion of physical storage 1210.

Should one of the nodes 1206 experience a failover event, a peer high-availability (HA) node of nodes 1206 can take over data services (e.g., reads, writes, etc.) for the failed node. In one or more embodiments, this takeover may include taking over a portion of physical storage 1210 originally assigned to the failed node or providing data services (e.g., reads, writes) from another portion of physical storage 1210, which may include a mirror or copy of the data stored in the portion of physical storage 1210 assigned to the failed node. In some cases, this takeover may last only until the failed node returns to being functional, online, or otherwise available.

Figure 13:
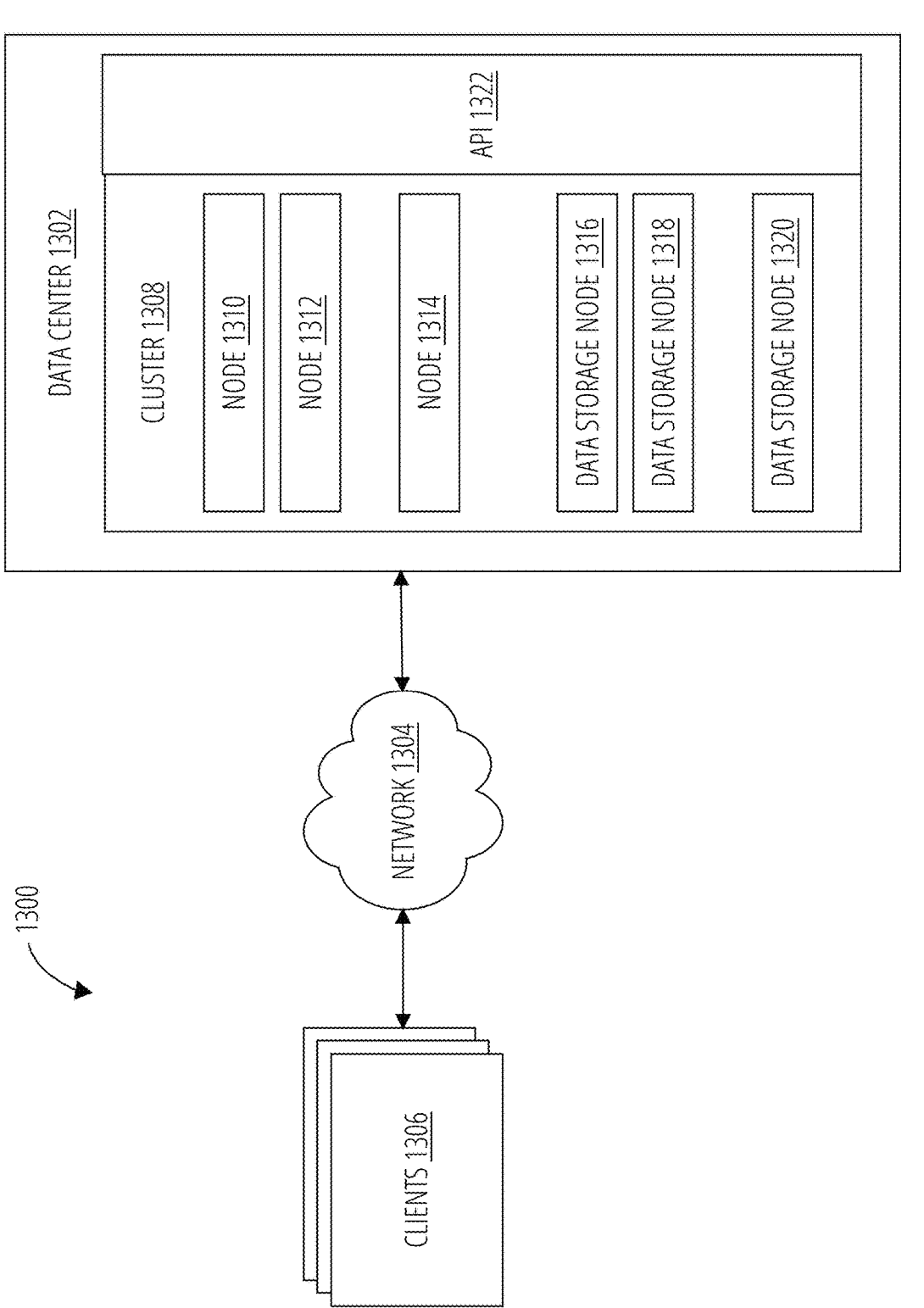
FIG. 13 is a block diagram illustrating an example on-premises environment in which various embodiments may be implemented.

FIG. 13 is a block diagram illustrating an example on-premises environment 1300 in which various embodiments may be implemented. In the context of the present example, on-premises environment 1300 includes data center 1302, network 1304, and clients 1306 (which may be analogous to clients 1208). Data center 1302 and clients 1306 may be coupled in communication via network 1304, which, depending upon the particular implementation, may be a Local Area Network (LAN), a Wide Area Network (WAN), or the Internet. Alternatively, some portion of clients 1306 may be present within data center 1302.

Data center 1302 may represent an enterprise data center (e.g., an on-premises customer data center) that is build, owned, and operated by a company or data center 1302 may be managed by a third party (or a managed service provider) on behalf of the company, which may lease the equipment and infrastructure. Alternatively, data center 1302 may represent a colocation data center in which a company rents space of a facility owned by others and located off the company premises. Data center 1302 is shown including a distributed storage system (e.g., cluster 1308). Those of ordinary skill in the art will appreciate additional information technology (IT) infrastructure would typically be part of data center 1302; however, discussion of such additional IT infrastructure is unnecessary to the understanding of the various embodiments described herein.

Turning now to cluster 1308 (which may be analogous to cluster 1202), it includes multiple nodes (e.g., node 1310, node 1312, node 1314) and multiple data storage nodes (e.g., data storage node 1316, data storage node 1318, data storage node 1320), which may be analogous to nodes 1206 and which may be collectively referred to simply as nodes) and an Application Programming Interface (API 1322). In the context of the present example, the nodes are organized as a cluster and provide a distributed storage architecture to service storage requests issued by one or more clients (e.g., clients 1306) of the cluster. Data served by the nodes may be distributed across multiple storage units embodied as persistent storage units, including but not limited to hard disk drives, solid state drives, flash memory systems, or other storage units.

API 1322 may provide an interface through which cluster 1308 is configured and/or queried by external actors. Depending upon the particular implementation, API 1322 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, API 1322 may provide access to various telemetry data (e.g., performance, configuration and other system data) relating to cluster 1308 or components thereof. As those skilled in the art will appreciate various types of telemetry data may be made available via API 1322, including, but not limited to measures of latency, utilization, and/or performance at various levels (e.g., the cluster level, the node level, or the node component level).

Figure 14:
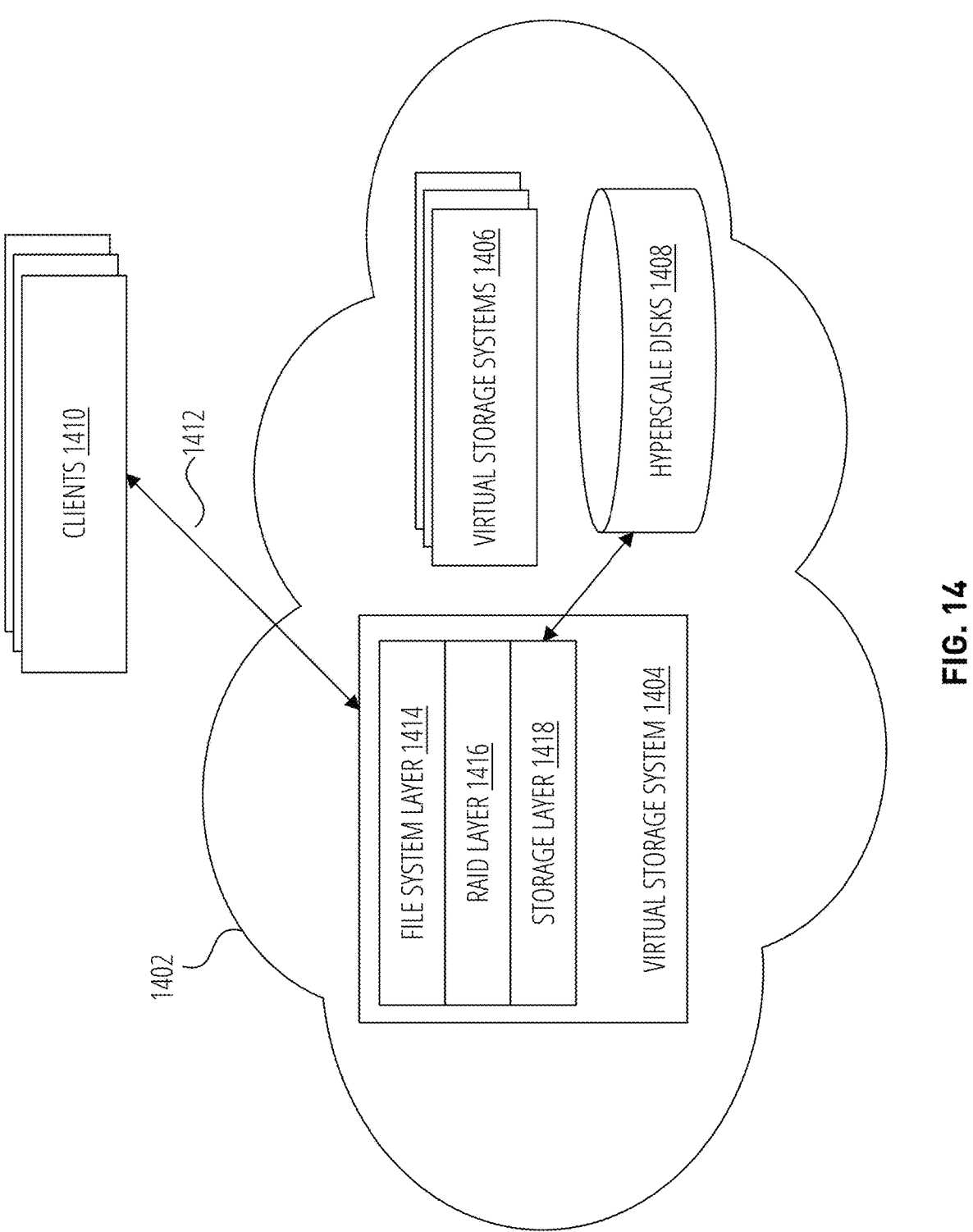
FIG. 14 is a block diagram illustrating an example cloud environment in which various embodiments may be implemented.

FIG. 14 is a block diagram illustrating an example cloud environment (e.g., hyperscaler 1402) in which various embodiments may be implemented. In the context of the present example, virtual storage system 1404, which may be considered exemplary of virtual storage systems 1406, may be run (e.g., on a VM or as a containerized instance, as the case may be) within a public cloud provided by a public cloud provider (e.g., hyperscaler 1402). In this example, virtual storage system 1404 makes use of storage (e.g., hyperscale disks 1408) provided by hyperscaler 1402, for example, in the form of solid-state drive (SSD) backed or hard-disk drive (HDD) backed disks. The cloud disks (which may also be referred to herein as cloud volumes, storage units, or simply volumes or storage) may include persistent storage (e.g., disks) and/or ephemeral storage (e.g., disks), which may be analogous to physical storage 1210. In an example, virtual storage system 1404 provides the functionality of management agent 148. Similarly, virtual storage systems 1406 can also provide the functionality of management agent 148.

Virtual storage system 1404 may present storage over a network to clients 1410 (which may be analogous to clients 1208 and clients 1306) using various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. Clients 1410 may request services of virtual storage system 1404 by issuing input/output requests 1412 (e.g., file system protocol messages (in the form of packets) over the network). A representative client of clients 1410 may comprise an application, such as a database application, executing on a computer that "connects" to virtual storage system 1404 over a computer network, such as a point-to-point link, a shared local area network (LAN), a wide area network (WAN), or a virtual private network (VPN) implemented over a public network, such as the Internet.

In the context of the present example, virtual storage system 1404 is shown including a number of layers, including file system layer 1414 and one or more intermediate storage layers (e.g., RAID layer 1416 and storage layer 1418). These layers may represent components of data management software or storage operating system (not shown) of virtual storage system 1404. File system layer 1414 generally defines the basic interfaces and data structures in support of file system operations (e.g., initialization, mounting, unmounting, creating files, creating directories, opening files, writing to files, and reading from files). A non-limiting example of file system layer 1414 is the Write Anywhere File Layout (WAFL) Copy-on-Write file system (which represents a component or layer of ONTAP software available from NetApp, Inc. of San Jose, CA).

RAID layer 1416 may be responsible for encapsulating data storage virtualization technology for combining multiple hyperscale disks 1408 into RAID groups, for example, for purposes of data redundancy, performance improvement, or both. Storage layer 1418 may include storage drivers for interacting with the various types of hyperscale disks 1408 supported by hyperscaler 1402. Depending upon the particular implementation file system layer 1414 may persist data to hyperscale disks 1408 using one or both of RAID layer 1416 and storage layer 1418.

The various layers described herein, and the processing described below may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage units, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud" or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises.

In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein a "V+ tree" generally refers to an m-ary tree data structure with a variable number of children per node. A V+ tree consists of a root, internal nodes, and leaves. A V+ tree can be viewed as a B+ tree in which the keys contained within the nodes are variable length.

Portions of various examples may be provided as a computer program product, which may include a non-transitory computer-readable medium having stored thereon computer program instructions, which may be used to program a computer (or other electronic devices) for execution by one or more processors to perform a process according to certain examples. The computer-readable medium may include, but is not limited to, magnetic disks, optical disks, read-only memory (ROM), random access memory (RAM), erasable programmable read-only memory (EPROM), electrically erasable programmable read-only memory (EEPROM), magnetic or optical cards, flash memory, or other type of computer-readable medium suitable for storing electronic instructions. Moreover, examples may also be downloaded as a computer program product, wherein the program may be transferred from a remote computer to a requesting computer. In some examples, non-transitory computer readable storage medium 918 has stored thereon data representing sequences of instructions that, when executed by processor(s) 916, cause processor(s) 916 to perform certain operations. Similarly, non-transitory computer readable storage medium 1120 has stored thereon data representing sequences of instructions that, when executed by processor(s) 1118 cause processor(s) 1118 to perform certain operations.

All examples and illustrative references are non-limiting and should not be used to limit the claims to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:
   one or more data storage devices comprising at least a first storage device and a second storage device;
   a management agent having at least a hardware processor and a memory communicatively coupled with the one or more data storage devices, the at least one hardware processor configured to cause the management agent to:
      collect metric-relevant information from at least the one or more data storage devices;
      collect at least characteristics corresponding to power sources available to provide power to the one or more data storage devices;
      generate cost metrics associated with the one or more data storage devices based on the collected metric-relevant information and the characteristics corresponding to power sources;
      generate one or more recommendations for cost or power savings from moving cold data from the first storage device to the second storage device based on the generated cost metrics;
      receive user input corresponding to selection of at least one of the one or more recommendations;
      analyze the received user input to determine cold data movement associated with the one or more data storage devices to implement the selected at least one of the one or more recommendations; and
      cause cold data movement associated with the selected at least one of the one or more recommendations to be implemented.

2. The system of claim 1 wherein the cost metrics are based, at least in part, on collected data gathered from the one or more data storage devices that are part of a distributed storage system and from remote sources that provide device-specific specifications.

3. The system of claim 2 wherein the cost metrics based on the collected data from the remote sources comprise at least characteristics corresponding to power sources available to provide power to one or more portions of the system.

4. The system of claim 1 wherein the selected at least one of the one or more recommendations to be implemented comprise at least migration of data between specific data storage devices.

5. The system of claim 1 wherein the selected at least one of the one or more recommendations to be implemented comprise at least changes associated with an operating environment corresponding to at least a subset of the one or more data storage devices.

6. The system of claim 1 wherein the selected at least one of the one or more recommendations to be implemented comprise at least deactivation of at least one of the one or more data storage devices.

7. The system of claim 1 wherein at least a portion of the selected at least one of the one or more recommendations are based, at least in part, on calculated metrics that can be compared to one or more of desired performance metrics, corresponding metrics of other components in an operating environment corresponding to at least a subset of the one or more data storage devices.

8. A management agent in a distributed storage system having one or more data storage devices, the management agent having at least a hardware processor and a memory communicatively coupled with the one or more data storage devices, the hardware processor configured to cause the management agent to:

collect metric-relevant information from at least the one or more data storage devices;

collect at least characteristics corresponding to power sources available to provide power to the one or more data storage devices;

generate cost metrics associated with the one or more data storage devices based on the collected metric-relevant information and the characteristics corresponding to power sources;

generate one or more recommendations for cost or power savings from moving cold data from the first storage device to the second storage device based on the generated cost metrics;

receive user input corresponding to selection of at least one of the one or more recommendations;

analyze the received user input to determine cold data movement associated with the one or more data storage devices to implement the selected at least one of the one or more recommendations; and cause cold data movement associated with the selected at least one of the one or more recommendations to be implemented.

9. The management agent of claim 8 wherein a first portion of the cost metrics are based, at least in part, on collected data gathered from the one or more data storage devices that are part of a distributed storage system;

a second portion of the cost metrics are collected from remote sources that provide device-specific specifications; and the the one or more recommendations are presented in one or more portions of a graphical user interface (GUI).

10. The management agent of claim 9 wherein the second portion of the cost metrics comprise at least characteristics corresponding to power sources available to provide power to one or more portions of the system.

11. The management agent of claim 8 wherein the selected at least one of the one or more recommendations to be implemented comprise at least migration of data between specific data storage devices.

12. The management agent of claim 8 wherein the selected at least one of the one or more recommendations to be implemented comprise at least changes associated with an operating environment corresponding to at least a subset of the one or more data storage devices.

13. The management agent of claim 8 wherein the selected at least one of the one or more recommendations to be implemented comprise at least deactivation of at least one of the one or more data storage devices.

14. The management agent of claim 8 wherein at least a portion of the selected at least one of the one or more recommendations are based, at least in part, on calculated metrics that can be compared to one or more of desired performance metrics, corresponding metrics of other components in an operating environment corresponding to at least a subset of the one or more data storage devices.

15. A non-transitory computer readable medium having stored thereon instructions that, when executed by one or more processors, cause a system to:

collect metric-relevant information from at least one or more data storage devices;

collect at least characteristics corresponding to power sources available to provide power to the one or more data storage devices;

generate cost metrics associated with the one or more data storage devices based on the collected metric-relevant information;

generate one or more recommendations for cost or power savings from moving cold data from a first storage device to a second storage device based on the generated cost metrics and the characteristics corresponding to power sources;

receive user input corresponding to selection of at least one of the one or more recommendations;

analyze the received user input to determine cold data movement associated with the one or more data storage devices to implement the selected at least one of the one or more recommendations; and cause cold data movement associated with the selected at least one of the one or more recommendations to be implemented.

16. The non-transitory computer readable medium of claim 15 wherein a first portion of the cost metrics are based, at least in part, on collected data gathered from the data storage devices that are part of a distributed storage system, and a second portion of the cost metrics are collected from remote sources that provide device-specific specifications.

17. The non-transitory computer readable medium of claim 16 the second portion of the cost metrics comprises at least characteristics corresponding to power sources available to provide power to one or more portions of the system.

18. The non-transitory computer readable medium of claim 15 wherein the selected at least one of the one or more recommendations to be implemented comprise at least migration of data between specific data storage devices.

19. The non-transitory computer readable medium of claim 15 wherein the selected at least one of the one or more recommendations to be implemented comprise at least changes associated with an operating environment corresponding to at least a subset of the one or more data storage devices.

20. The non-transitory computer readable medium of claim 15 wherein at least a portion of the selected at least one of the one or more recommendations are based, at least in part, on calculated metrics that can be compared to one or more of desired performance metrics, corresponding metrics of other components in an operating environment corresponding to at least a subset of the one or more data storage devices.

\* \* \* \* \*